US011601708B2

(12) United States Patent
Barvo et al.

(10) Patent No.: US 11,601,708 B2
(45) Date of Patent: *Mar. 7, 2023

(54) SYNCHRONIZING STREAMS OF CO-WATCHING DIGITAL VIDEO CONTENT WHILE PROVIDING LIVE DIGITAL VIDEO CHAT STREAMS ACROSS MULTIPLE CLIENT DEVICES

(71) Applicant: Meta Platforms, Inc., Menlo Park, CA (US)

(72) Inventors: Pablo Jose Barvo, Kirkland, WA (US); Zheng Fang, Bellevue, WA (US); Nora Micheva, Seattle, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/556,633

(22) Filed: Dec. 20, 2021

(65) Prior Publication Data

US 2022/0116679 A1    Apr. 14, 2022

Related U.S. Application Data

(63) Continuation of application No. 16/987,046, filed on Aug. 6, 2020, now Pat. No. 11,206,443.

(Continued)

(51) Int. Cl.
 *H04N 21/43* (2011.01)
 *H04N 21/845* (2011.01)
(Continued)

(52) U.S. Cl.
 CPC ... *H04N 21/43076* (2020.08); *H04N 21/2187* (2013.01); *H04N 21/47217* (2013.01); *H04N 21/8456* (2013.01)

(58) Field of Classification Search
 CPC ......... H04N 21/43076; H04N 21/2187; H04N 21/47217; H04N 21/8456; H04N 21/4788; H04N 21/242
 See application file for complete search history.

(56) References Cited

U.S. PATENT DOCUMENTS 11,206,443 B2 * 12/2021 Barvo ................ H04N 21/2187
2011/0029874 A1    2/2011 Profitt
(Continued)

OTHER PUBLICATIONS

"Airtime: Group Facetime + YouTube," Wezift.com [online], Retrieved on Aug. 18, 2020, 16 pages, Retrieved from the Internet: URL: https://wezift.com/parent-portal/apps/airtime-group-video-messaging/.

(Continued)

*Primary Examiner* — John R Schnurr
(74) *Attorney, Agent, or Firm* — Keller Preece PLLC

(57) ABSTRACT

This disclosure describes a video co-watching system that can efficiently, flexibly, and securely provide access to, and synchronize, co-watching digital video content across multiple participant devices while providing live digital video chat streams between the participant devices. For example, the video co-watching system can enable the participant devices to simultaneously present co-watching digital video content together with a presentation of a video chat. In addition, the video co-watching system can synchronize the co-watching digital video content at each participant device while also facilitating video chatting between the participant devices by transmitting a playback modifier signal to cause one participant device to perform a modification to the playback made at another participant device.

20 Claims, 17 Drawing Sheets

Related U.S. Application Data

(60) Provisional application No. 63/022,288, filed on May 8, 2020.

(51) Int. Cl.
*H04N 21/472* (2011.01)
*H04N 21/2187* (2011.01)

(56) References Cited

U.S. PATENT DOCUMENTS

| | | | | |
|---|---|---|---|---|
| 2011/0154417 A1* | 6/2011 | Civanlar | ................ | H04N 7/15 |
| | | | | 725/105 |
| 2014/0214920 A1* | 7/2014 | Wong | ................ | G06F 16/60 |
| | | | | 709/203 |
| 2018/0352303 A1* | 12/2018 | Siddique | ................ | H04N 7/157 |

OTHER PUBLICATIONS

"Be Together with Friends, on Squad," SquadApp.io [online], Retrieved on Aug. 18, 2020, 2 pages, Retrieved from the Internet: URL: https://squadapp.io.

"Welcome to the Virtual Movie Theatre," Scener.com [online], Retrieved on Aug. 18, 2020, 7 pages, Retrieved from the Internet: URL: https://www.scener.com.

* cited by examiner

SYNCHRONIZING STREAMS OF CO-WATCHING DIGITAL VIDEO CONTENT WHILE PROVIDING LIVE DIGITAL VIDEO CHAT STREAMS ACROSS MULTIPLE CLIENT DEVICES

CROSS-REFERENCE TO RELATED APPLICATIONS

This application is a continuation of U.S. patent application Ser. No. 16/987,046, filed on Aug. 6, 2020, which claims the benefit of and priority to provisional application No. 63/022,288 filed on May 8, 2020. Each of the aforementioned applications is hereby incorporated by reference in its entirety.

BACKGROUND

Advancements in software and hardware platforms have led to a variety of improvements in systems that connect and transfer digital content between client devices across computer networks. For example, digital communication systems are now able to implement video chats between client devices to facilitate real-time, digital communication between digital conference participants. Indeed, some digital communication systems can connect groups of more than two client devices to initiate a common video conference between the client devices utilizing various computer networking technologies.

Despite these advances however, conventional digital communication systems continue to suffer from a number of disadvantages, particularly in their efficiency, flexibility, and data security. For example, some conventional systems inefficiently utilize computing resources such as processing power, processing time, and memory in processing excessive numbers of user interactions to share digital content with other devices in a group video chat. Particularly, conventional systems require users to navigate through many layers of user interfaces (sometimes across multiple applications) to access desired data and/or functionality to, for example, locate a digital image to upload or share to other devices in a group video chat. To share digital content such as a digital image, these systems often require a separate application (apart from a video co-watching application) such as a messaging application to share the digital content when such functionality is not available as part of the group video chat directly.

In addition to being inefficient, some conventional digital communication systems are also inflexible. For example, to access shared digital content within a common video chat, conventional systems often require devices to download the digital content and to present the digital content outside of the common video chat. Due to the siloed nature of presenting shared digital content and providing a group video chat in these conventional systems, such systems are often limited to asynchronous digital content sharing. As another example, many conventional digital communication systems provide limited content controls within a group video chat.

Beyond inefficiency and inflexibility, conventional digital communication systems are also insecure. To elaborate, conventional systems often track and obtain large amounts of device data based on accessing digital content (such as digital videos). For example, conventional systems gather information to determine user preferences, track user-specific viewing histories, and generate recommendations of suggested videos. Despite the sophistication of many of these conventional systems, accessing and storing large amounts of personal device and/or user information undermines data privacy and exposes private information to security attacks by malicious actors. Thus, because many conventional digital communication systems monitor and track detailed information pertaining to digital content shared between client devices, these systems are more susceptible to security breaches that expose sensitive information.

Thus, there are disadvantages with regard to conventional digital communication systems.

SUMMARY

One or more embodiments described herein provide benefits and solve one or more of the foregoing or other problems in the art with systems, methods, and non-transitory computer readable media that can efficiently, flexibly, and securely provide access to, and synchronize, co-watching digital video content across multiple participant devices while providing live digital video chat streams between the participant devices. In particular, the disclosed systems can simultaneously present co-watching digital video content together with a presentation of a video chat for watching and reacting to the co-watching digital video content together in real time. In addition, the disclosed systems can synchronize the co-watching digital video content at each participant device while also facilitating video chatting between the participant devices. In particular, the disclosed systems can provide access to independent streams of co-watching digital video content and can synchronize playback of the independent streams by transmitting a playback modifier signal to cause participant devices to modify playback synchronized to the modifications of another participant device.

Moreover, by utilizing a playback modifier signal, the disclosed systems can also improve security in synchronizing co-watching digital content across participant devices (e.g., without identifying, tracking, storing, or exposing information regarding the digital content). To illustrate, the disclosed systems can provide a user interface at each participant device that includes a digital media player. The digital media player can access and display digital video content from third-party content providers. Without identifying, monitoring, or tracking this digital video content, the disclosed systems can still synchronize the digital video content playback across the participant devices. For example, the disclosed systems can identify an encrypted co-watching digital video content identifier and distribute the encrypted identifier to media players at each participant device. Moreover, the disclosed systems can pass playback modifier signals to the individual participant devices to synchronize the co-watching digital video content without accessing the co-watching digital video content itself. In this manner, the disclosed systems can synchronize digital video content during a digital video chat while improving digital security and privacy.

Additional features and advantages of the present application will be set forth in the description which follows, and in part will be obvious from the description, or may be learned by the practice of such example embodiments.

BRIEF DESCRIPTION OF THE DRAWINGS

The detailed description refers to the drawings briefly described below.

DETAILED DESCRIPTION

Figure 1:
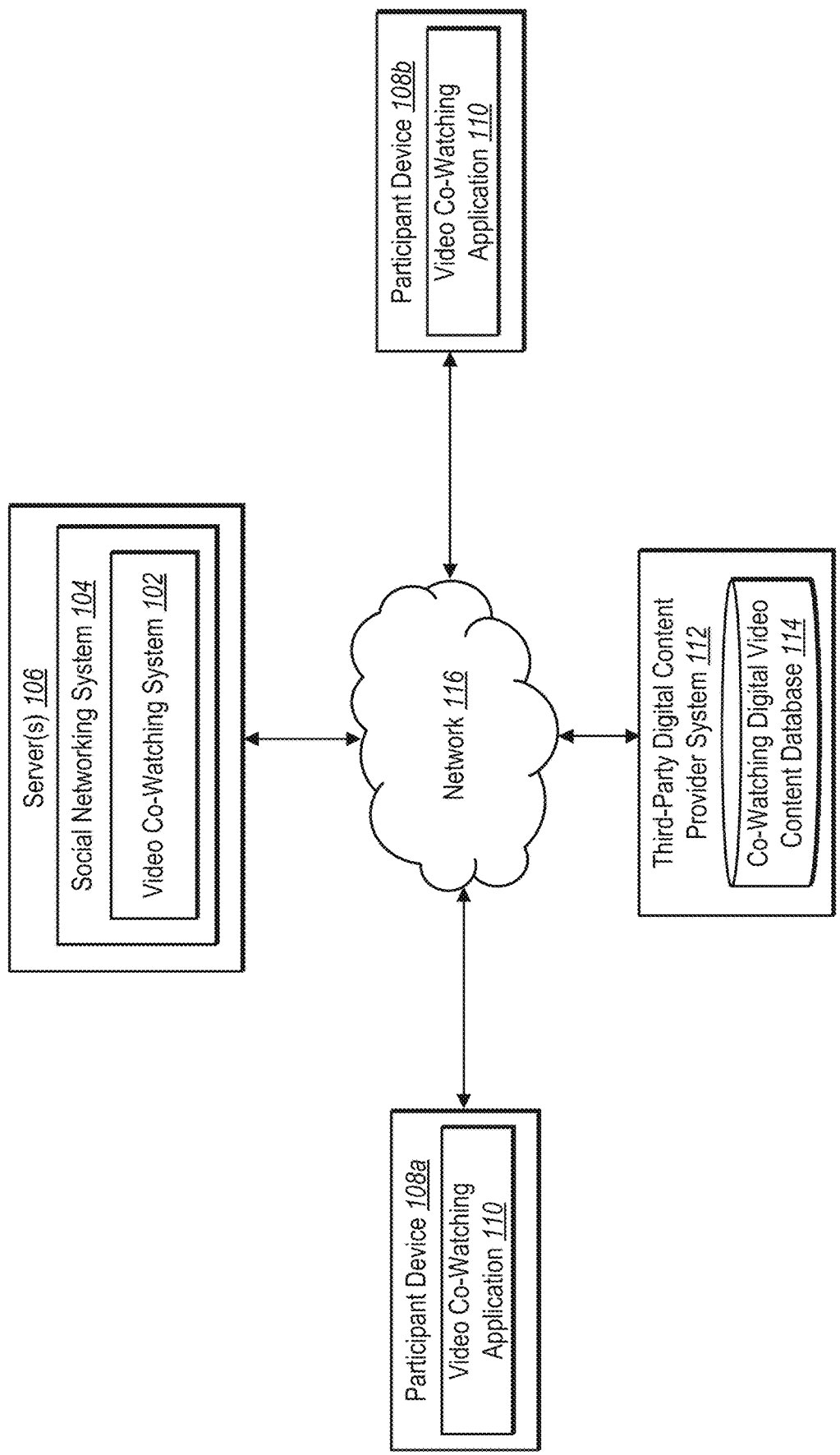
FIG. 1 illustrates a block diagram of an environment for implementing a video co-watching system in accordance with one or more embodiments.

One or more embodiments described herein provide benefits and solve one or more of the foregoing or other problems in the art with a video co-watching system that can efficiently, accurately, and securely synchronize co-watching digital content session between multiple participant devices while providing live digital video chat streams across the participant devices. As part of synchronizing co-watching digital content across multiple participant devices, the disclosed systems can provide a synchronized digital content video chat interface. In particular, the synchronized digital content video chat interface can include both a consolidated live video stream (that includes video streams from the participant devices in a video chat) as well as a digital media player that presents co-watching digital video content. While providing live video streams for video chatting between participant devices (and while the participant devices are playing the co-watching digital video content), the video co-watching system can further identify an indication of a modification to playback of the co-watching digital video content made at one of the participant devices. Based on the indication of the modification to the playback, the video co-watching system can synchronize the playback across other participant devices in the video chat by transmitting a media player playback modifier signal that causes the media player of the other participant devices to perform the modification.

As mentioned, the video co-watching system can provide a synchronized digital content video chat interface that includes different portions or regions for displaying different content (e.g., for displaying content from different sources). More specifically, the synchronized digital content video chat interface can include a consolidated live video stream that presents live video streams captured by participant devices for participating together in a live video chat. In addition, the synchronized digital content video chat interface can include a digital media player that presents a stream of co-watching digital video content. For example, a digital media player at a first participant device can present a first stream of the co-watching digital video content and a digital media player at a second participant device can present a second stream of the co-watching digital video content. In some embodiments, the video co-watching system provides the digital media player as part of the synchronized digital content video chat interface for access to content associated with the video co-watching system. In other embodiments, the video co-watching system integrates a digital media player from a third-party digital content provider system into the synchronized digital content video chat interface for access to content associated with the third-party digital content provider system.

Based on receiving an indication to begin co-watching digital video content (e.g., via user interaction selecting co-watching digital video content during a video chat), the video co-watching system can provide access to the co-watching digital video content. More specifically, the video co-watching system can cause the participant devices in the video chat to present the selected co-watching digital video content, where each participant device plays its own stream independently of the other participant devices. In some embodiments, the video co-watching system provides the co-watching digital video content to the participant devices for playback. In other embodiments, the video co-watching system does not host the co-watching digital video content but instead facilitates access to the co-watching digital video content by the participant devices and causes the participant devices to play the co-watching digital video content. Further, the video co-watching system can cause each participant device to stream the co-watching digital video content independently without monitoring or controlling the streams from a central location.

As mentioned above, the video co-watching system can improve privacy and security of device data (and/or user data) by refraining from identifying selected co-watching digital video content and refraining from associating the co-watching digital video content with any participant devices and/or users. By avoiding identification or collection of information about co-watching digital video content, the video co-watching system can nevertheless provide access to, and cause participant devices to play, co-watching digital video content while also providing live video streams for a video chat.

For example, in some embodiments, based on user interaction selecting co-watching digital video content for co-watching across the participant devices, the video co-watching system receives an encrypted co-watching digital video content identifier from a third-party digital content provider system that hosts the co-watching digital video content. In addition, the video co-watching system can provide the encrypted co-watching digital video content identifier to other participant devices to cause the digital media players at those devices to access and play the corresponding co-watching digital video content. Thus, the video co-watching system can cause participant devices to present co-watching digital video content without accessing or identifying the co-watching digital video content itself.

As mentioned above, the video co-watching system can synchronize playback of the co-watching digital video content based on an indication of a modification to the playback. In particular, the video co-watching system can receive an indication from a participant device that indicates user selection to play, pause, fast forward, rewind, or skip within the co-watching digital video content. Based on the indication of the modification at one participant device, the video co-watching system can cause the other participant devices to perform the same modification. More specifically, the video co-watching system can provide a media player playback modifier signal to the other participant devices to cause the media player at the other participant devices to perform the modification without ascertaining information about the co-watching digital video content itself. In some embodiments, the video co-watching system nests the media player playback modifier signal within live video stream data associated with the live video stream. Apart from the indication of the modification, the video co-watching system refrains from monitoring or controlling playback of the co-watching digital video content at the participant devices and relies on the participant devices to play the co-watching digital video content at the same speed.

The video co-watching system can also provide audio controls for the co-watching digital video content that are independent of audio controls for the consolidated live video stream. In particular, the video co-watching system can provide a first audio control option for modifying a volume setting of the consolidated live video stream while maintaining a volume setting of the digital media player. In addition, the video co-watching system can provide a second audio control option for modifying a volume setting of the digital media player while maintaining the volume setting of the consolidated live video stream. In some embodiments, the video co-watching system can automatically modify (or cause a participant device to modify) a volume setting for the co-watching digital video content without modifying a volume setting for a consolidated live video stream of a video chat (or vice-versa). For example, the video co-watching system can determine changes to an audio amplitude of the co-watching digital video content during playback and can automatically (e.g., without user input) adjust a volume setting of the consolidated live video stream such to have a different level than that of the co-watching digital video content (e.g., so that either the co-watching digital video content or the live video streams are easier to hear).

As suggested above, the video co-watching system can provide several advantages over conventional digital communication systems. In particular, the video co-watching system can improve efficiency over conventional systems by reducing the number of user interactions required to access desired data and/or functionality for sharing digital content within a group video chat. For example, the video co-watching system can provide simultaneous display of a consolidated live video stream for a video chat and a co-watching digital video content selection menu for selecting co-watching digital video content for playback across all devices in the video chat. Thus, unlike conventional systems that require navigation through different layers, interfaces, and applications to share digital content, the video co-watching system can integrate, together with the consolidated live video stream, the selecting and viewing of co-watching digital video content directly within a single synchronized digital content video chat interface.

From the perspective of additional participant devices (other than a participant device that initiates the co-watching), the video co-watching system can require fewer (e.g., zero) user interactions to provide the co-watching digital video content for display. Indeed, the video co-watching system can automatically initiate co-watching across devices by causing other participant devices within a common video chat to present the co-watching digital video content within a synchronized digital content video chat interface based on an indication to begin co-watching. By contrast, many conventional systems require express user interactions to select, download, and open any shared digital content, often using an application separate from a video chat application to view the digital content. Thus, the video co-watching system can utilize computing resources such as processing time, processing power, and memory more efficiently than conventional systems that, by comparison, process larger numbers of user interactions to access desired video content sharing data and/or video content sharing functionality.

As another example of improved efficiency, the video co-watching system can reduce usage of computing resources for analyzing and storing digital content. In particular, some conventional systems store and manage digital content data to, for example, host streams of digital video provided to client devices. Such storage and broadcasting of digital content is computationally expensive, especially when the library of digital content and the number of client devices accessing the digital content becomes large. To reduce the computation cost of conventional systems, the video co-watching system can access co-watching digital video content from a third-party digital content provider system without directly storing or providing the video co-watching content itself (or even any metadata or other information about the video co-watching content).

As yet another example of improved efficiency, the video co-watching system can reduce the computation cost for synchronizing streams of video content. While many conventional systems require separate streams for playing video content and for providing a video chat, the video co-watching system can require fewer computing resources for handling media player playback modifier signals. For instance, in some embodiments, the video co-watching system nests a media player playback modifier signals within existing data streams. In other embodiments, the video co-watching system generates a separate data channel for including media player playback modifier signals as part of a video chat service. However, to synchronize playback of the co-watching digital video content, the video co-watching system need not provide a new data stream but can instead nest, or provide in tandem, a media player playback modifier signal together with live video stream data associated with a consolidated live video stream of an ongoing video chat. Thus, in some embodiments the video co-watching system can avoid adding additional communication channels beyond the channels required for facilitating the video chat while still facilitating playback of, and synchronizing, co-watching digital video content.

In addition to improving efficiency, the video co-watching system can also improve flexibility over conventional digital communication systems. As opposed to conventional systems that limit control of shared digital content to a single host device, the video co-watching system can flexibly enable multiple participant devices to control playback of co-watching digital video content. To elaborate, the video co-watching system can provide playback control options for manipulating co-watching digital video content to pause, play, fast forward, rewind, and skip the co-watching digital video content to all participant devices viewing the co-watching digital video content and participating in a common video chat. The video co-watching system can further synchronize the video co-watching content based on control operations received from any of the participant devices (and not just a host or initiator device). Thus, the video co-watching system enables greater flexibility for presenting and manipulating co-watching digital video content across multiple client devices participating in a video chat.

As still another improvement to flexibility, the video co-watching system can provide more flexible audio controls than conventional systems. For example, as opposed to a conventional system that provides only a single, universal audio control for adjusting volume across all channels of client device feeds, the video co-watching system can provide channel-specific audio controls to each participant device in a video chat. Thus, the video co-watching system can enable participant devices to adjust a volume setting for playback of co-watching digital video content independently of a volume setting for live video streams of the video chat.

Beyond improving efficiency and flexibility, the video co-watching system can further improve data security over conventional systems. In particular, in contrast to conventional systems that host video content directly and determine content-related information about users such as viewing habits, the video co-watching system can facilitate simultaneous, synchronized co-watching of video co-watching content across multiple client devices engaged in a video chat without extracting, determining, or monitoring sensitive content-specific information about the participant devices and/or the corresponding user accounts. For example, the video co-watching system can transmit a media player playback modifier signal to cause a participant device to perform a playback modification without identifying or determining any information about the co-watching digital video content itself. Relatedly, the video co-watching system can receive and transmit an encrypted co-watching digital video content identifier to obfuscate the co-watching digital video content such that the video co-watching system never identifies any specific information about the video co-watching content but can still cause participant devices to access and play the co-watching digital video content. The video co-watching system thereby maintains increased anonymity and privacy for participant devices and user accounts and prevents unnecessary transfer and storing of potentially sensitive information, which, further reduces the risk of malicious parties gaining access to such information.

As indicated by the foregoing discussion, the present disclosure utilizes a variety of terms to describe features and advantages of the video co-watching system. For example, as used herein, the term "co-watching digital video content" refers to digital video content that is streamed or provided to multiple participant devices for playback. In particular, co-watching digital video content can include digital video content streamed at multiple participant devices such that the participant devices can display the video content together (i.e., to "co-watch" the video content) in real time (or near real time). As explained in greater detail below, the video co-watching system can present co-watching digital video during simultaneous presentation of live video streams of a video chat at the participant devices. Co-watching digital video content can include digital video content from the video co-watching system or from a third-party digital content provider system.

As mentioned, the video co-watching system can provide a synchronized digital content video chat interface to participant devices. As used herein, the term "synchronized digital content video chat interface" refers to a graphical user interface presented via a participant device and that includes a consolidated live video stream as well as a digital media player. For example, the synchronized digital content video chat interface includes separate portions or regions for the consolidated live video streams and the digital media player so that participants can communicate via a video chat while simultaneously watching the co-watching digital video content.

Relatedly, the term "consolidated live video stream" refers to a presentation or a display of two or more live video streams together in a single interface, where the live video streams are captured by separate participant devices engaged in a video chat. Particularly, a consolidated live video stream can include a presentation of a first live video stream captured by a first participant device and a second live video stream captured by a second participant device. In addition, the term "digital media player" refers to one or more user interface elements that enable a participant device to access, display, and manipulate playback of co-watching digital video content. The digital media player can include a set of software instructions that accompany the user interface elements to cause a participant device to perform particular functions to access, display, and manipulate playback of co-watching digital video content. Further, the digital media player presents separate streams of co-watching digital video content on each participant device, where the playback of each stream on the individual participant devices is independent of the playback of the other streams (i.e., the playback of the streams is not universally controlled at a central server).

As mentioned above, video co-watching system can synchronize playback across participant devices by transmitting a media player playback modifier signal. As used herein, the term "media player playback modifier signal" (or simply "playback modifier signal") refers to a digital command or a digital signal that causes the digital media player at a participant device to perform a particular function (or set of functions) to manipulate playback of co-watching digital video content. In particular, a media player playback modifier signal can include one or more computer instructions to cause the digital media player to perform or implement a particular modification in relation to an individual stream of co-watching digital video content at a participant device. Relatedly, the term "playback modification" (or simply "modification") refers to a change or alteration to the playback of a stream of co-watching digital video content. Based on identifying a modification at one participant device, the video co-watching system can transmit a media player playback modifier signal to cause the other participant devices in the video chat to perform the same modification.

As further mentioned above, the video co-watching system can cause participant devices to begin presenting co-watching digital video content by providing a co-watching digital content identifier to the participant devices. As used herein, the term "co-watching digital content identifier"

refers to a digital identifier that indicates a particular item of co-watching digital video content. For example, a co-watching digital content identifier can include a digital indicator that causes participant devices to access and present the item of co-watching digital video content, but that does not reveal the identity of (or any other information pertaining to) the co-watching digital video content selected for playback. Indeed, in some embodiments, the video co-watching system receives an encrypted co-watching digital content identifier which obfuscates the identity of the particular item of co-watching digital video content selected for playback at the participant devices. By utilizing co-watching digital content identifiers, the video co-watching system can avoid determining the identify of, or other information about, the co-watching digital video content.

Additional detail regarding the video co-watching system will now be provided with reference to the figures. For example, FIG. 1 illustrates a schematic diagram of an example environment for implementing a video co-watching system 102 in accordance with one or more embodiments. An overview of the video co-watching system 102 is described in relation to FIG. 1. Thereafter, a more detailed description of the components and processes of the video co-watching system 102 is provided in relation to the subsequent figures.

As shown in FIG. 1, the environment includes server(s) 106, a first participant device 108a, a second participant device 108b, a third-party digital content provider system 112, and a network 116. Each of the components of the environment can communicate via the network 116, and the network 116 may be any suitable network over which computing devices can communicate. Example networks are discussed in more detail below in relation to FIGS. 13 and 14.

As mentioned, the environment includes a first participant device 108a and a second participant device 108b. The participant devices 108a and 108b can be one of a variety of computing devices, including a smartphone, a tablet, a smart television, a desktop computer, a laptop computer, a virtual reality device, an augmented reality device, or some other computing device as described in relation to FIGS. 13 and 14. The participant devices 108a-108b can receive user input in the form of user actions such as touch gestures or clicks in relation to user interface elements displayed as part of the video co-watching application 110. In some embodiments, the participant devices 108a-108b are associated with respective users of the social networking system 104, where the users have social media accounts or user accounts registered with the social networking system 104. Although individual devices corresponding to individual accounts are shown in FIG. 1, each user account can be associated with multiple devices (e.g., a single user can access the social networking system 104 and the video co-watching system 102 utilizing a tablet device, a mobile phone, and/or a personal computer). The participant devices 108a-108b can also provide information pertaining to user input to the server(s) 106. Thus, the video co-watching system 102 on the server(s) 106 can receive user input information from the participant devices 108a-108b to indicate actions within the video co-watching application 110 for initiating a video chat, participating in a video chat, providing electronic communications between the participant devices 108a-108b, initiating playback of co-watching digital video content, and modifying playback of the co-watching digital video content.

In some embodiments, the first participant device 108a indicates a user selection of co-watching digital video content to share or to co-watch with the second participant device 108b. In turn, the second participant device 108b accesses and presents its own stream of the co-watching digital video content while the first participant device 108a also presents a stream of the co-watching digital video content. The video co-watching system 102 also receives or identifies an indication of a playback modification from the first participant device 108a. In response, the video co-watching system 102 synchronizes the playback of the co-watching digital video content at the first participant device 108a and the second participant device 108b by providing a playback modifier signal to the second participant device 108b to cause a digital media player at the second participant device 108b to perform the playback modification.

As shown, the participant devices 108a-108b include a video co-watching application 110. In particular, the video co-watching application 110 may be a web application, a native application installed on the participant devices 108a-108b (e.g., a mobile application, a desktop application, a web-based browser application, etc.), or a cloud-based application where all or part of the functionality is performed by the server(s) 106. The video co-watching application 110 can present (or cause the participant devices 108a-108b to present) graphical user interfaces such as a synchronized digital content video chat interface. The synchronized digital content video chat interface can include a consolidated live video stream for a video chat and can also include a digital media player portraying a stream of co-watching digital video content. In some embodiment, the synchronized digital content video chat interface can include a co-watching digital video content selection menu for selecting an item of co-watching digital video content. In some embodiments, the video co-watching application 110 provides a selectable option for a participant to navigate to a video co-watching content selection menu for selecting co-watching digital video content to share across client devices. In these or other embodiments, the video co-watching application 110 provides a video chat element within a display of co-watching digital video content (e.g., as part of the digital media player) and that is selectable to invite participant devices to join a video chat.

As shown, the environment also includes a third-party digital content provider system 112. The video co-watching system 102 can exchange digital information with the third-party digital content provider system 112 (e.g., via one or more APIs) for integrating a digital media player within a synchronized digital content video chat interface of the video co-watching application 110. The video co-watching system 102 can receive other information from the third-party digital content provider system 112 as well, such as encrypted co-watching digital video content identifiers that correspond to particular co-watching digital video content, and that, when provided to the participant devices 108a-108b, cause the participant devices 108a-108b to access and present the corresponding co-watching digital video content. In some embodiments, the third-party digital content provider system 112 can include a co-watching digital video content database 114 for storing digital video content for presentation as video co-watching content.

In some embodiments, the video co-watching system 102 communicates with the third-party digital content provider system 112 to receive playback modifier signals from the third-party digital content provider system 112 that indicate various playback modifications performed by client devices. To elaborate, in embodiments where the video co-watching system 102 utilizes one or more APIs of the third-party digital content provider system 112 to integrate a digital media player of the third-party digital content provider system 112 into the synchronized digital content video chat interface, the video co-watching system 102 receives playback modifier signals (e.g., from the third-party digital content provider system 112 and/or the participant device 108a) based on user interaction with the digital media player. In addition, the video co-watching system 102 can synchronize the playback of the co-watching digital video content by causing other participant devices to perform the same playback modification in relation to their individual streams of co-watching digital video content.

As illustrated in FIG. 1, the environment includes the server(s) 106. The server(s) 106 may generate, store, process, receive, and transmit electronic data, such as user interface information, co-watching digital video content selection information, playback modifier signals, and user interaction information. For example, the server(s) 106 can transmit data to the first participant device 108a to provide a synchronized digital content video chat interface via the video co-watching application 110. In addition, the video co-watching system 102 can receive an indication of a selection of co-watching digital video content from the first participant device 108a and can provide information to the second participant device 108b to cause the second participant device 108b to present the same co-watching digital video content. In some embodiments, the server(s) 106 comprises a digital content server. The server(s) 106 can also comprise an application server, a communication server, a web-hosting server, a social networking server, a video communication server, or a digital communication management server.

As shown in FIG. 1, the server(s) 106 can also include the video co-watching system 102 implemented as part of a social networking system 104. The social networking system 104 can communicate with the participant devices 108a-108b. As described in further detail below, the social networking system 104 can determine and store information about participant devices 108a-108b including connection information between participants such as levels of affinity between social networking accounts associated with the participants.

In some embodiments, though not illustrated in FIG. 1, the environment may have a different arrangement of components and/or may have a different number or set of components altogether. For example, the environment can include any number of participant devices, and the participant devices (e.g., the participant devices 108a-108b) may communicate directly with the video co-watching system 102, bypassing the network 116. Additionally, the video co-watching system 102 can include one or more additional databases (e.g., co-watching digital video content database or a social media account database) housed on the server(s) 106 or elsewhere in the environment. Further, the video co-watching system 102 may be implemented by (e.g., located entirely or in part) on one or more other components of the environment. For example, the video co-watching system 102 may be implemented by the participant devices 108a-108b, the server(s) 106 (externally from the social networking system 104), and/or a third-party device. As another example, the social networking system 104 can provide co-watching digital content directly from a co-watching digital video content database stored on the server(s) 106 (rather than through the third-party digital content provider system 112).

Figure 2:
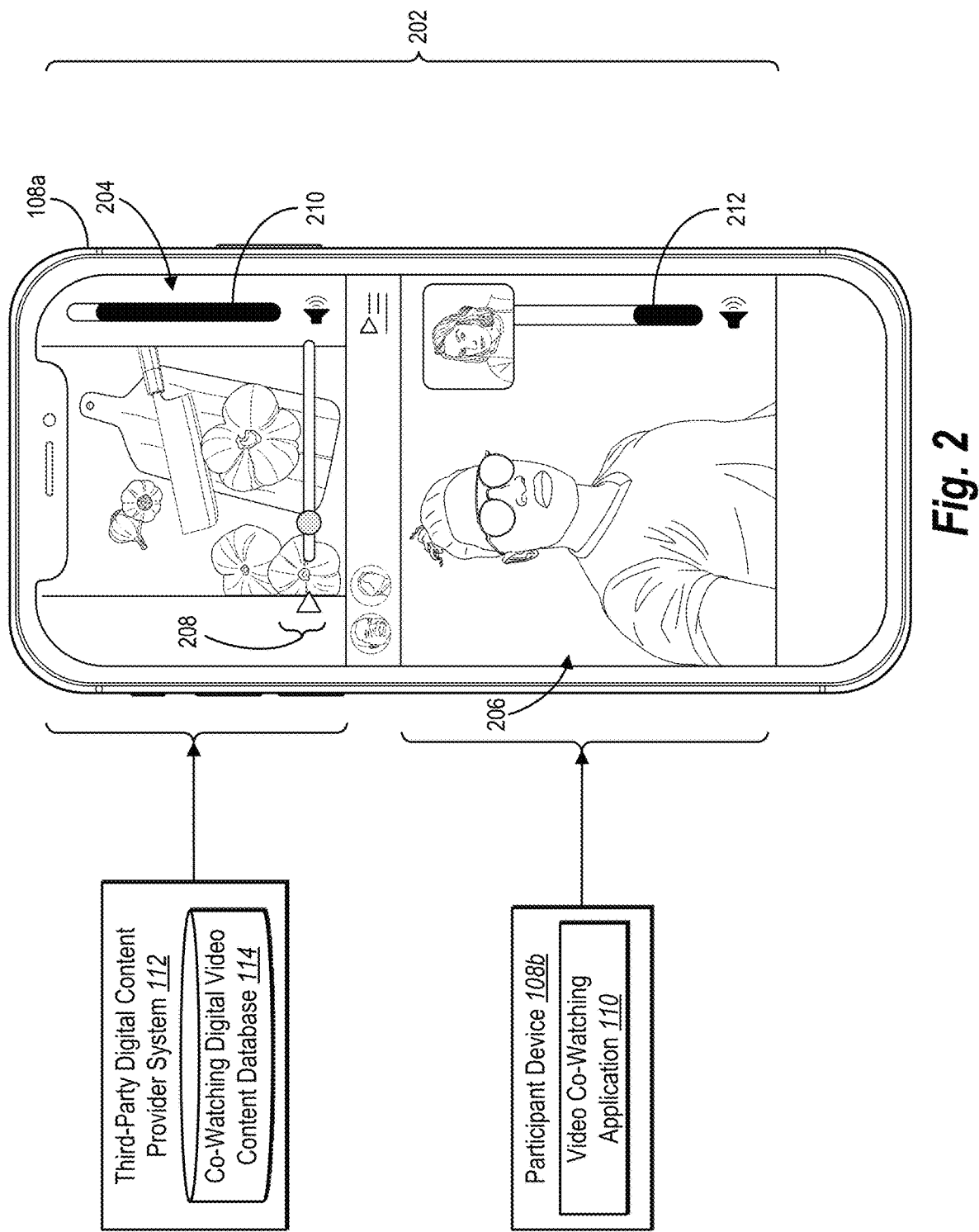
FIG. 2 illustrates an example participant device displaying a synchronized digital content video chat interface in accordance with one or more embodiments.

As mentioned above, the video co-watching system 102 can provide a synchronized digital content video chat interface that includes a consolidated live video stream and a digital media player. In particular, the video co-watching system 102 can enable participant devices (e.g., the participant devices 108a-108b) to participate in a group video chat (via the consolidated live video stream) while simultaneously presenting co-watching digital video content (via the digital media player). FIG. 2 illustrates the participant device 108a presenting a synchronized digital content video chat interface 202 in accordance with one or more embodiments.

As illustrated in FIG. 2, the participant device 108a presents the synchronized digital content video chat interface 202 including a consolidated live video stream 206 and a digital media player 204. The consolidated live video stream 206 portrays live video streams captured by respective participant devices participating together in a video chat. For example, the consolidated live video stream 206 includes one live video stream (e.g., the larger live video stream) captured by a different participant device (e.g., the participant device 108b) and another live video stream (e.g., the smaller live video stream in the upper-right of the consolidated live video stream 206) captured by the participant device 108a. As shown, the participant device 108b captures a live video stream which the video co-watching system 102 provides as part of the consolidated live video stream 206 for facilitating a video chat. Indeed, the video co-watching system 102 receives and provides live video streams to participant devices engaged in a common video chat, such as the participant device 108a and the participant device 108b.

As also illustrated in FIG. 2, the participant device 108a presents the digital media player 204. In particular, the digital media player 204 presents co-watching digital video content for simultaneous display with the consolidated live video stream 206. In some embodiments, the video co-watching system 102 provides the digital media player 204 as part of the video co-watching application 110. In other embodiments, the video co-watching system 102 does not provide the digital media player 204 as a native or internal part of the video co-watching application but instead provides access to the digital media player 204 provided by the third-party digital content provider system 112. For example, the video co-watching system 102 provides a sort of window as part of the video co-watching application 110 whereby the participant device 108a accesses the digital media player of the third-party digital content provider system 112. Indeed, the video co-watching system 102 accesses one or more application programming interfaces ("APIs") of the third-party digital content provider system 112 to integrate the digital media player 204 from the third-party digital content provider system 112 for display as part of the synchronized digital content video chat interface 202.

In one or more embodiments, the video co-watching system 102 provides co-watching digital video content to the participant device 108a (and to the participant device 108b). Indeed, in these embodiments, the video co-watching system 102 stores co-watching digital video content within a database and provides the co-watching digital video content for selection and playback at the participant devices 108a-108b. In some embodiments, the video co-watching system 102 does not provide the co-watching digital video content. Instead, the video co-watching system 102 provides a way for the participant devices 108a-108b to access the co-watching digital video content from the third-party digital content provider system 112.

For example, the video co-watching system 102 provides the digital media player 204 (as part of the video co-watching application 110) but does not directly provide co-watching digital video content. Rather, the video co-watching system 102 provides access to play the co-watching digital video content from the third-party digital content provider system 112 by way of the digital media player 204. As another example, the video co-watching system 102 directly provides neither the co-watching digital video content nor the digital media player 204. Rather, the video co-watching system 102 accesses one or more APIs from the third-party digital content provider system 112 to integrate the digital media player 204 from the third-party digital content provider system 112 (e.g., as a window to a web interface for the digital media player 204 and not as a native component of the video co-watching application 110). Such integration of the digital media player 204 further provides access to co-watching digital video content hosted by the third-party digital content provider system 112.

By integrating the digital media player 204 in this way, the digital media player 204 may have a different appearance and/or different available functionality (e.g., for manipulating playback) for the third-party digital content provider system 112 than it does for different third-party digital content provider systems. Indeed, depending on a third-party digital content provider system selected by a participant, the video co-watching system 102 can provide access to different digital media players as part of the synchronized digital content video chat interface 202.

In some embodiments, the video co-watching system 102 generates elements of the digital media player 204 that look and feel native to the video co-watching application 110 but that integrate or interact with functionality of third-party digital content provider system 112. Indeed, the video co-watching system 102 can provide playback controls 208 that look as though they are part of the video co-watching application 110 (e.g., with a matching color scheme, theme, or layout) but that are tied to functionality of the third-party digital content provider system 112. Thus, based on user interaction with the playback controls 208, the third-party digital content provider system 112 pauses, plays, rewinds, skips, or fast forwards the co-watching digital video content (and provides a corresponding playback modifier signal to the video co-watching system 102).

As shown in FIG. 2, the digital media player 204 includes playback controls 208. More specifically, the digital media player 204 includes the playback controls 208 for implementing playback modifications such as pausing, skipping, fast forwarding, or rewinding co-watching digital video content. Based on identifying an indication of a playback modification from the participant device 108a, the video co-watching system 102 further causes the digital media player at the participant device 108b to perform the same modification. For instance, the video co-watching system 102 transmits a playback modifier signal to the participant device 108b to cause the digital media player at the participant device 108b to perform the playback modification.

As further illustrated in FIG. 2, the synchronized digital content video chat interface 202 includes a first audio control option 210 and a second audio control option 212. More specifically, the first audio control option 210 is dedicated to controlling a volume setting for the digital media player 204, and the second audio control option 212 is dedicated to controlling a volume setting for the consolidated live video stream 206. Indeed, the video co-watching system 102 can receive indications of different user inputs with respect to the first audio control option 210 and the second audio control option 212 to adjust the volume settings differently. In some embodiments, the video co-watching system 102 automatically modifies (or causes the participant device 108a to modify) the volume settings for the digital media player 204 and the consolidated live video stream 206 (e.g., based on changes to the live video streams from the participant devices or audio of the co-watching digital video content). For example, as the co-watching digital video content plays through a quieter portion, the video co-watching system 102 can automatically lower the volume setting for the consolidated live video stream 206 so the co-watching digital video content is still audible. As another example, if participants begin to speak, the video co-watching system 102 can increase the volume of the of live video stream and decrease the volume of the co-watching digital video content.

Figure 3:
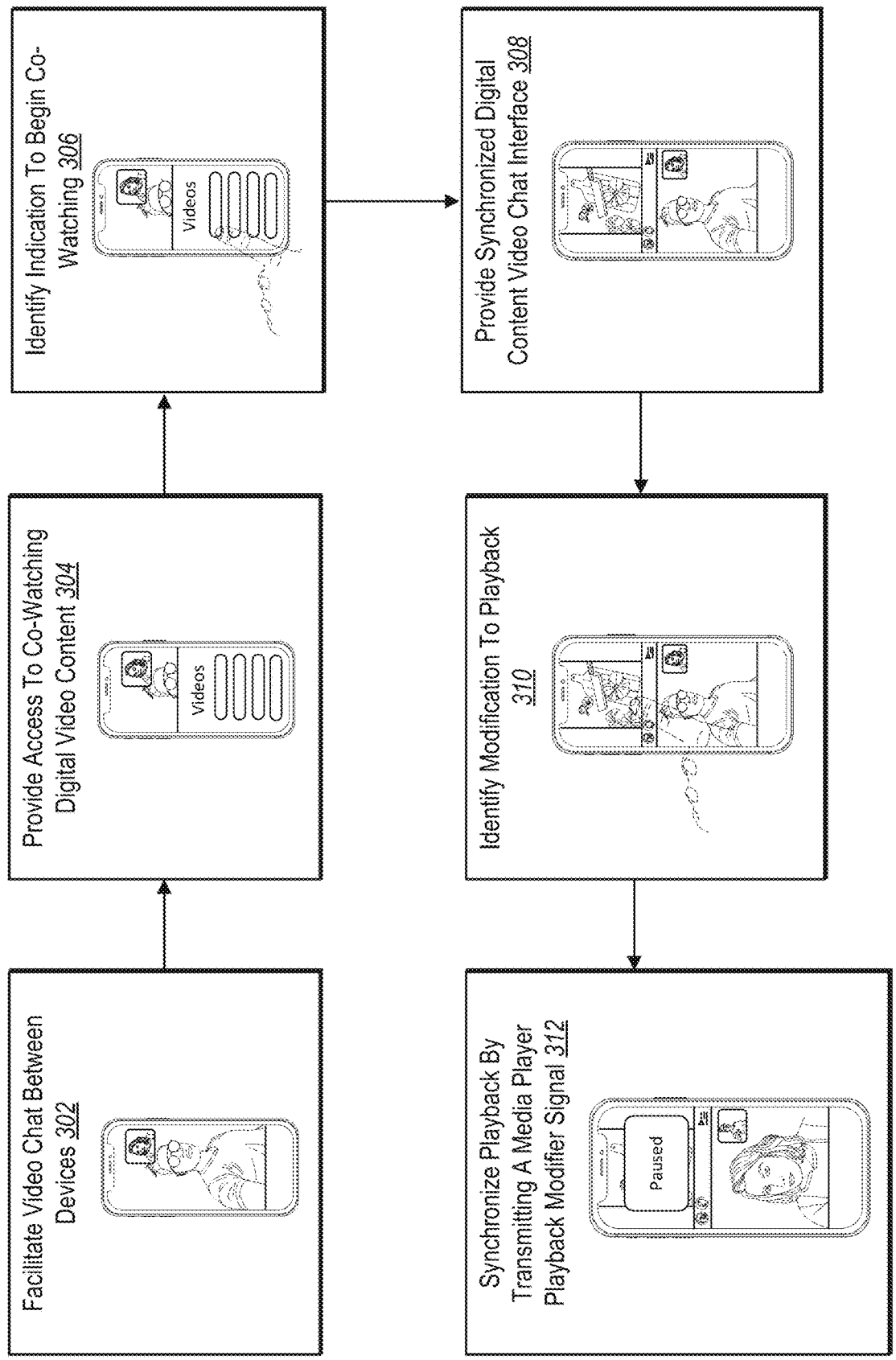
FIG. 3 illustrates a sequence of acts for initiating a co-watching session with a video chat and synchronizing playback of co-watching digital video content in accordance with one or more embodiments.

As mentioned, the video co-watching system 102 can facilitate co-watching sessions for participant devices (e.g., the participant devices 108a-108b) to engage in a video chat while simultaneously presenting co-watching digital video content. FIG. 3 illustrates a series of acts 302-312 that the video co-watching system 102 performs to facilitate co-watching among the participant devices 108a-108b in accordance with one or more embodiments.

As illustrated in FIG. 3, the video co-watching system 102 performs an act 302 to facilitate a video chat between the participant devices 108a-108b. In particular, the video co-watching system 102 receives a first live video stream captured by the participant device 108a and provides the first live video stream for display at the participant device 108b. Similarly, the video co-watching system 102 receives a second live video stream captured by the participant device 108b and provides the second live video stream for display at the participant device 108a. Thus, the video co-watching system 102 provides real time (or near real time) video communication between the participant devices 108a and 108b.

As also illustrated, the video co-watching system 102 performs an act 304 to provide access to co-watching digital video content. Particularly, the video co-watching system 102 provides a co-watching digital video content selection menu based on user interaction to begin co-watching. For instance, the video co-watching system 102 receives an indication of a user selection to select co-watching digital video content for initiating a co-watching session from the participant device 108a. In response, the video co-watching system 102 provides access to a co-watching digital video content selection menu (either directly from the video co-watching system 102 or by integrating APIs from the third-party digital content provider system 112). Within the co-watching digital video content selection menu, the video co-watching system 102 provides access to selectable items of co-watching digital video content. In some embodiments, the video co-watching system 102 populates the co-watching digital video content selection menu with recommend digital videos based on social graph information, as indicated by edges and nodes of the social graph associated with the user account corresponding to the participant device 108a. Additional information regarding social graphs is provided below with reference to FIG. 15.

The video co-watching system 102 further performs an act 306 to identify an indication to begin co-watching. More particularly, the video co-watching system 102 identifies a user selection of an item of co-watching digital video content from the co-watching digital video content selection menu. Based on receiving an indication of a user selection, the video co-watching system 102 causes the participant device 108b to access and play the co-watching digital video content selected at the participant device 108a. In some embodiments, the video co-watching system 102 receives the indication of the user selection from the participant device 108a, while in other embodiments, the video co-watching system 102 receives the indication of the user selection from the third-party digital content provider system 112. In one or more embodiments, the video co-watching system 102 facilitates co-watching only between participant devices associated with the social networking system 104. For instance, in some embodiments, the video co-watching system 102 only provides an option to begin co-watching upon determining that one or more participant devices (or, some cases, all participant devices) participating in the video chat are connected, as indicated by nodes and edges of a social graph (as described in further detail in relation to FIG. 15).

Indeed, in embodiments where the video co-watching system 102 integrates a digital media player from (and provides access to co-watching digital video content from) the third-party digital content provider system 112, the video co-watching system 102 may not directly receive an indication of a user selection of co-watching digital video content. Instead, the video co-watching system 102 integrates the co-watching digital video content selection menu from the third-party digital content provider system 112 and receives an indication of a user selection from the third-party digital content provider system 112. For example, the video co-watching system 102 receives the indication in the form of an encrypted co-watching digital video content identifier that obfuscates the identity of the selected co-watching digital video content from the video co-watching system 102 (and from the server(s) 106) but that causes a participant device to access and play the corresponding co-watching digital video content. Additional detail regarding the co-watching digital video content identifier is provided below in relation to FIG. 4.

As illustrated in FIG. 3, the video co-watching system 102 further performs an act 308 to provide a synchronized digital content video chat interface (e.g., the synchronized digital content video chat interface 202). Indeed, the video co-watching system 102 performs the act 308 in response to the indication of a user selection of co-watching digital video content. For example, the video co-watching system 102 provides the synchronized digital content video chat interface 202 to the participant device 108a and provides a synchronized digital content video chat interface to the participant device 108b. Thus, the video co-watching system 102 facilitates simultaneous presentation of the co-watching digital video content together with a consolidated live video stream for video chatting.

In addition, the video co-watching system 102 performs an act 310 to identify a modification to playback of the co-watching digital video content. More specifically, the video co-watching system 102 receives an indication of a playback modification made at the participant device. In some embodiments (e.g., where the video co-watching system 102 provides the digital media player 204 directly), the video co-watching system 102 receives the indication of the playback modification from the participant device 108a. In other embodiments (e.g., where the video co-watching system 102 provides access to a digital media player from the third-party digital content provider system 112), the video co-watching system 120 receives the indication of the playback modification from the third-party digital content provider system 112.

The video co-watching system 102 receives the indication of the playback modification in the form of a playback modifier signal that indicates a modification such as play, pause, fast forward, rewind, or skip. For example, the playback modifier signal can include information including the type of modification (e.g., play, pause, fast forward, rewind or skip) and a timestamp within the co-watching digital video content where the modification was performed at the participant device 108a (and therefore where the modification is to be performed at the participant device 108b). In some embodiments, the video co-watching system 102 performs the act 310 based on modifications to playback made at the participant device 108a or the participant device 108b. Indeed, the video co-watching system 102 can enable any participant device involved in co-watching to modify playback, not just the device that initiated the co-watching digital video content.

Based on identifying the modification to the playback, the video co-watching system 102 further performs an act 312 to synchronize playback by transmitting a media player playback modifier signal. In particular, the video co-watching system 102 transmits the playback modifier signal to the participant device 108b to cause the participant device 108b to perform the same modification made at the participant device 108a at the same timestamp within the co-watching digital video content. Thus, the video co-watching system 102 synchronizes playback of the co-watching digital video content at the participant devices 108a and 108b so that participants can react and contemporaneously experience the co-watching digital video content together in real time (or near real time).

Apart from synchronizing playback using playback modifier signals (in response to identifying a modification to playback at one of the participant devices 108a or 108b), the video co-watching system 102 need not control the playback of the co-watching digital video content at the participant devices 108a and 108b. Indeed, in some embodiments, the video co-watching system 102 does not host a central source for the co-watching digital video content used to keep each participant device 108a and 108b in lock step during playback. Rather, the video co-watching system 102 relies on the individual participant devices 108a and 108b to perform playback of their own independent streams at the same speed and only interrupts the playback for synchronization based on identifying a playback modification.

In some embodiments, the video co-watching system 102 performs additional or alternative acts and/or performs the acts 302-312 in a different order. For example, the video co-watching system 102 can enable the participant device 108a to begin presenting co-watching digital video content before participating in a video chat. More specifically, the video co-watching system 102 causes the participant device 108a to present co-watching digital video content (e.g., via the digital media player 204) and provides a selectable video chat option within the digital media player 204.

As another example, the video co-watching system 102 causes the participant device 108a to present digital video content for independent viewing while also including an option to invite other participant devices to co-watch the digital video content. The video co-watching system 102 further provides a co-watching option for display together with the digital video content, where the co-watching option is selectable to begin co-watching the digital video content by causing both the participant device 108a and the participant device 108b to present the digital video content as co-watching digital video content. In some embodiments, the video co-watching system 102 only provides an option to begin co-watching upon determining that the participant device 108*a* is associated with the social networking system 104. In these or other embodiments, upon selection of an option begin co-watching, the video co-watching system 102 provides a list of users to invite to co-watch, the list including users connected with the user of the participant device 108*a* within a social graph, as further described in relation to FIG. 15 below.

Based on user interaction with a video chat option presented with the co-watching digital video content, the video co-watching system 120 can initiate a video chat between the participant devices 108*a*-108*b* and can provide the synchronized digital content video chat interface 202 that includes the digital media player 204 and the consolidated live video stream 206. Thus, the video co-watching system 102 can enable the participant device 108*a* to initiate a video chat from a presentation of co-watching digital video content as well initiate a presentation of co-watching digital video content from a video chat.

Figure 4:
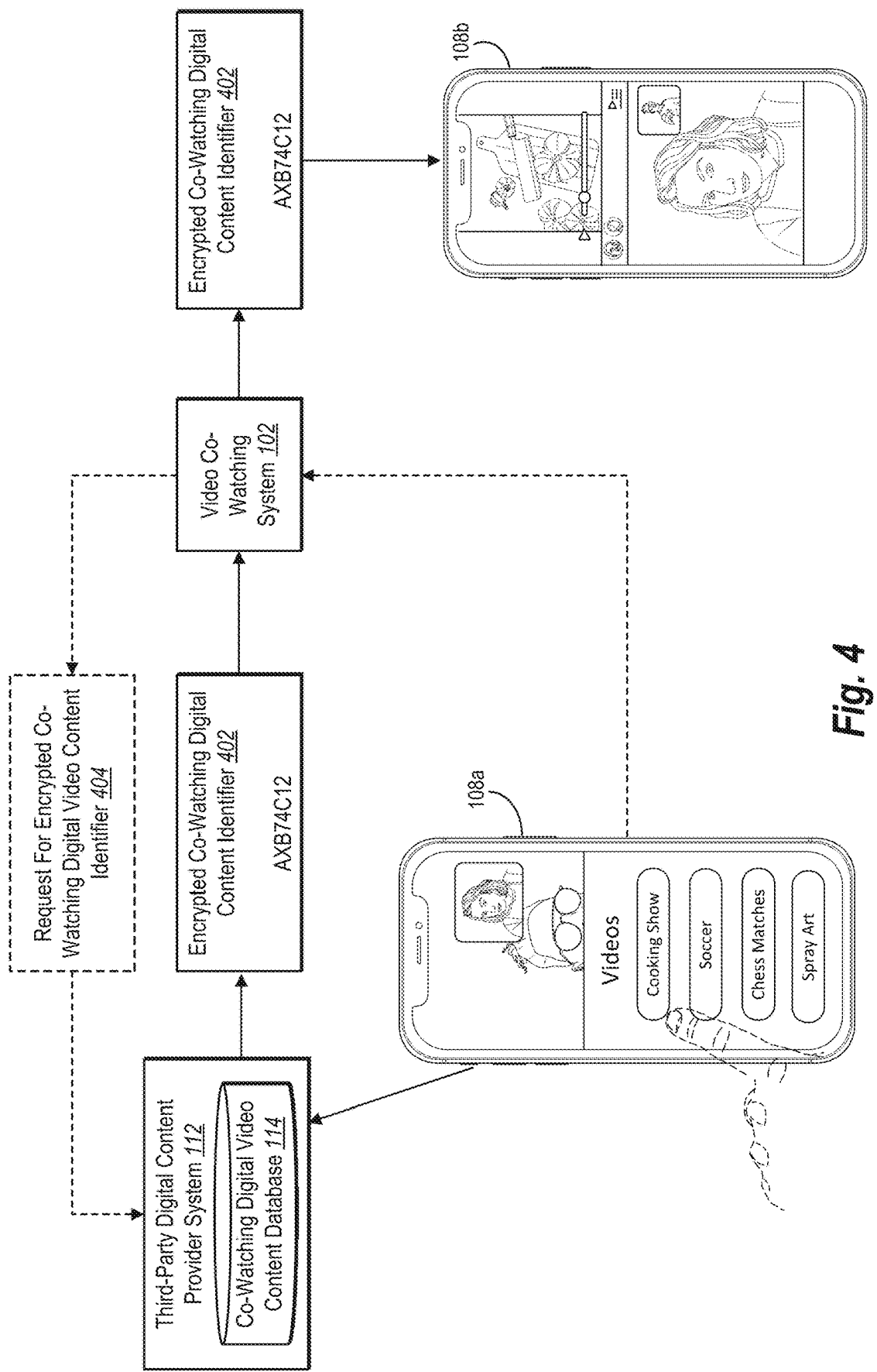
FIG. 4 illustrates a diagram of receiving and providing a co-watching digital video content identifier in accordance with one or more embodiments.

As mentioned, the video co-watching system 102 can receive a co-watching digital video content identifier corresponding to a particular item of co-watching digital video content and can provide the co-watching digital video content identifier to cause a participant device to stream the co-watching digital video content. In particular, the video co-watching system 102 can provide a co-watching digital video content identifier to cause a participant device to stream co-watching digital video content from the third-party digital content provider system 112 without the video co-watching system 102 identifying the co-watching digital video content. FIG. 4 illustrates receiving and providing an encrypted co-watching digital video content identifier in accordance with one or more embodiments.

As illustrated in FIG. 4, the participant device 108*a* receives or detects user interaction selecting co-watching digital video content from a co-watching digital video content selection menu. Based on the user interaction, the participant device 108*a* provides an indication of the selection of the co-watching digital video content to the third-party digital content provider system 112. For example, the indication includes information identifying a particular item of co-watching digital video content from the co-watching digital video content database 114.

The third-party digital content provider system 112 further provides an encrypted co-watching digital video content identifier 402 (represented by the encrypted value "AXB74C12") to the video co-watching system 102. The encrypted co-watching digital video content identifier 402 indicates the selected co-watching digital video content but also encrypts the identity of the co-watching digital video content so that the video co-watching system 102 does not determine the identity (or other information) regarding the co-watching digital video content. Although FIG. 4 illustrates an encrypted co-watching digital video content identifier 402, in some embodiments the co-watching digital video content identifier is not encrypted.

Based on receiving the encrypted co-watching digital video content identifier 402, the video co-watching system 102 does not determine information about the co-watching digital video content but transmits the encrypted co-watching digital video content identifier 402 to the participant device 108*b*. By transmitting the encrypted co-watching digital video content identifier 402 to the participant device 108*b*, the video co-watching system 102 causes the digital media player at the participant device 108*b* to access and present the co-watching digital video content indicated by the encrypted co-watching digital video content identifier 402. Specifically, the participant device 108*b* can transmit the encrypted co-watching digital video content identifier to the third-party digital content provider system 112 to access the co-watching digital video content. By relaying the encrypted co-watching digital video content identifier 402 in this way, the video co-watching system 102 facilitates co-watching of co-watching digital video content across the participant devices 108*a* and 108*b* while maintaining privacy and data security of co-watching digital video content and user-specific viewing information, even for co-watching digital video content hosted by the third-party digital content provider system 112. Additionally, by using the encrypted co-watching digital video content identifier 402, the video co-watching system 102 provides enhanced security and privacy by preventing third-party systems (e.g., the third-party digital content provider system 112) from accessing sensitive information about the participant devices 108*a* and 108*b*, such as user interactions at each participant device, live digital video streams (e.g., chat streams between participant devices), digital communications between participant devices, and relationship information regarding user accounts associated with the participant devices 108*a* and 108*b* that engage in co-watching and/or video chatting together.

In some embodiments, as shown in FIG. 4, the participant device 108*a* provides an indication of a user selection of co-watching digital video content to the video co-watching system 102. Based on receiving the indication of the user selection, the video co-watching system 102 provides a request for an encrypted co-watching digital video content identifier 404 to the third-party digital content provider system 112. In response to receiving the request, the third-party digital content provider system 112 generates and provides the encrypted co-watching digital video content identifier 402 to the video co-watching system 102. Thus, in some embodiments, the video co-watching system 102 causes the third-party digital content provider system 112 to generate the encrypted co-watching digital video content identifier 402 to prevent collection of unnecessary information.

Figure 5:
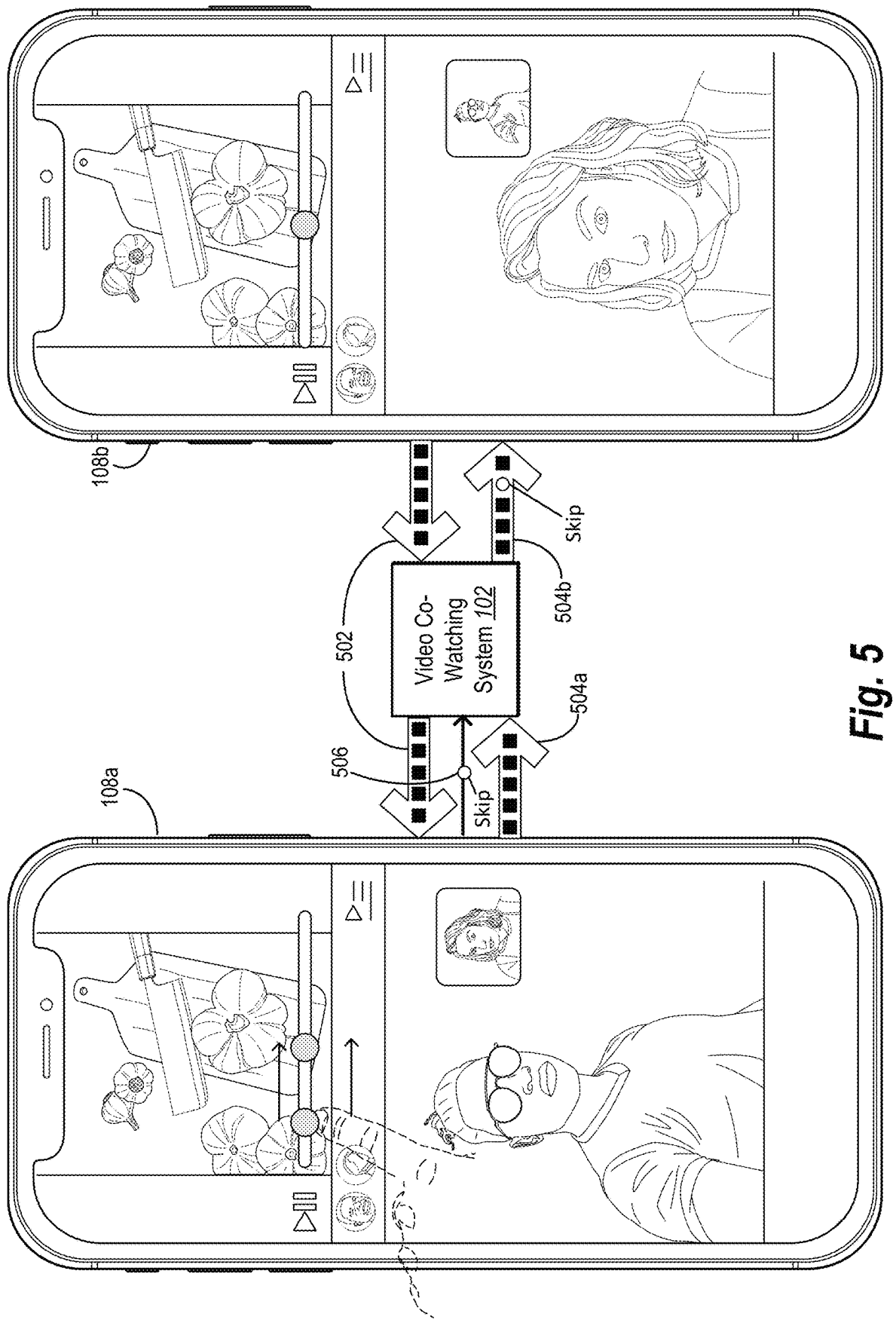
FIG. 5 illustrates a diagram of nesting a playback modifier signal within live video stream data in accordance with one or more embodiments.

As mentioned above, during playback of co-watching digital video content, the video co-watching system 102 can receive a playback modifier signal from a participant device and can transmit the playback modifier signal to another participant device to cause the participant device to perform the corresponding playback modification. In particular, the video co-watching system 102 can nest the playback modifier signal within an existing data channel or data stream without creating or sending a new data channel to the participant device. FIG. 5 illustrates nesting a playback modifier signal within live video stream data associated with a consolidated live video stream in accordance with one or more embodiments.

As illustrated in FIG. 5, the participant device 108*a* receives or detects user interaction to modify playback of the co-watching digital video content. In particular, the participant device 108*a* receives user interaction with the playback controls 208 within the digital media player 204 of the synchronized digital content video chat interface 202. As also illustrated in FIG. 5, the video co-watching system 102 facilitates a video chat by receiving and providing live video stream data to and from the participant device 108*a* and the participant device 108*b*. For example, the video co-watching system 102 receives the live video stream data 502 from the participant device 108*b* and provides the live video stream data 502 to the participant device 108*a* for display within the consolidated live video stream 206. In addition, the video co-watching system 102 receives the live video stream data 504a from the participant device 108a and provides modified live video stream data 504b to the participant device 108b.

As shown, the participant device 108a receives a playback modification in the form of a skip by detecting user input to move or scrub a playback location indicator (represented by the gray circle) to a new timestamp location along a timeline of the co-watching digital video content. Based on the user interaction to modify the playback, the participant device 108a transmits or provides a playback modifier signal 506 to the video co-watching system 102 that indicates the playback modification. Based on receiving the playback modifier signal 506, the video co-watching system 102 nests the playback modifier signal 506 within the live video stream data 504a. Indeed, the video co-watching system 102 modifies the live video stream data 504a to generate the modified live video stream data 504b that includes the playback modifier signal 506. For instance, the video co-watching system 102 nests the playback modifier signal 506 by including a data packet for the playback modifier signal 506 within a series of data packets of the live video stream data 504b for one or more live video streams captured by participant device(s). Thus, the video co-watching system 102 includes the playback modifier signal 506 within an existing data stream for the consolidated live video stream of the participant device 108b.

In addition, the video co-watching system 102 provides the modified live video stream data 504b to the participant device 108b to cause the digital media player at the participant device 108b to perform the same skip modification as was performed at the participant device 108a. For example, the playback modifier signal 506 includes computer instructions for the digital media player to perform the modification, including a timestamp for where the modification takes place within the co-watching digital video content. Indeed, as shown, the video co-watching system 102 displays the playback location indicator along the timeline at a timestamp corresponding to the timestamp of the modification made at the participant device 108a.

The video co-watching system 102 further provides the playback modifier signal 506 to the participant device 108b within the live video stream data 504b. Upon receipt of the playback modifier signal 506, the participant device 108b performs the playback modification indicated by the playback modifier signal 506. For instance, the participant device 108b skips ahead within the playback to a timestamp corresponding to the timestamp to which the provider device 108a skipped. Thus, the video co-watching system 102 synchronizes playback of the co-watching digital video content across participant devices 108a and 108b in response to identifying a playback modification.

In some embodiments, the video co-watching system 102 generates a separate playback modifier signal channel for transmitting the playback modifier signal 506 and to include in tandem with video stream data. Indeed, in these embodiments, the video co-watching system 102 receives and provides the playback modifier signal 506 within a dedicated playback modifier signal channel transmitted together with video stream data (e.g., the live video stream data 504a or 504b). Thus, rather than utilizing separate data streams for video stream data and the playback modifier signal 506, the video co-watching system 102 utilizes unified video streams that include video stream data and the playback modifier signal 506.

Figure 6B:
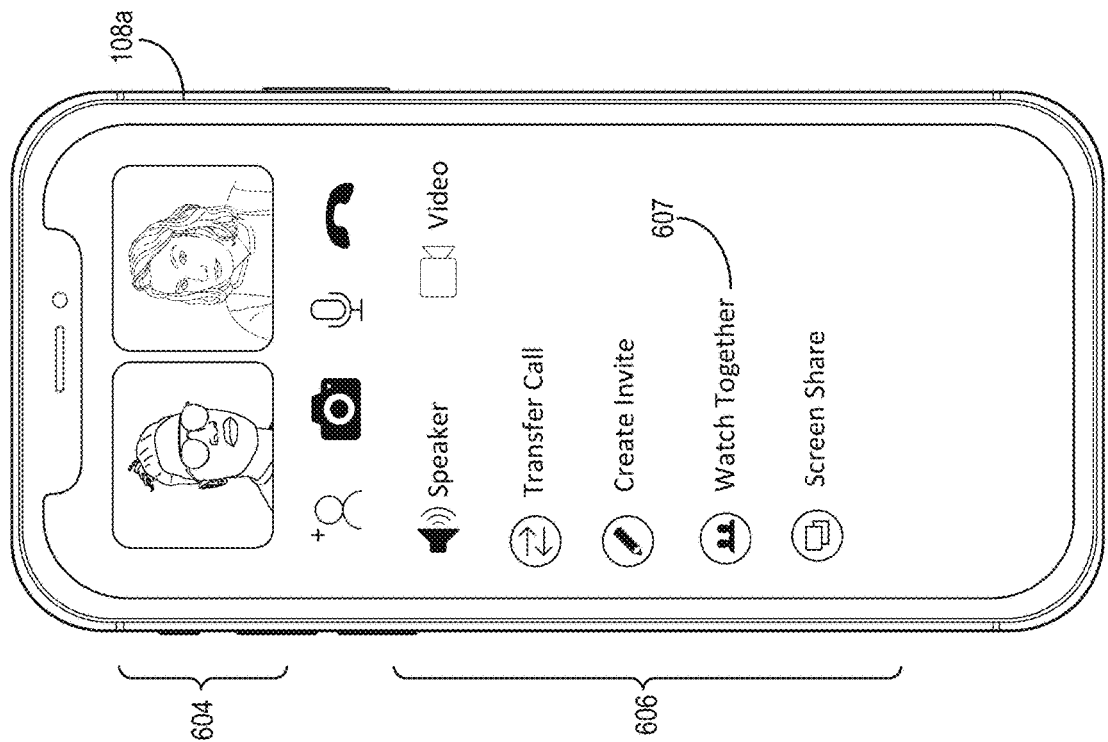
FIGS. 6A-6C illustrate an example series of user interfaces for initiating a co-watching session in accordance with one or more embodiments.
Figure 6A:
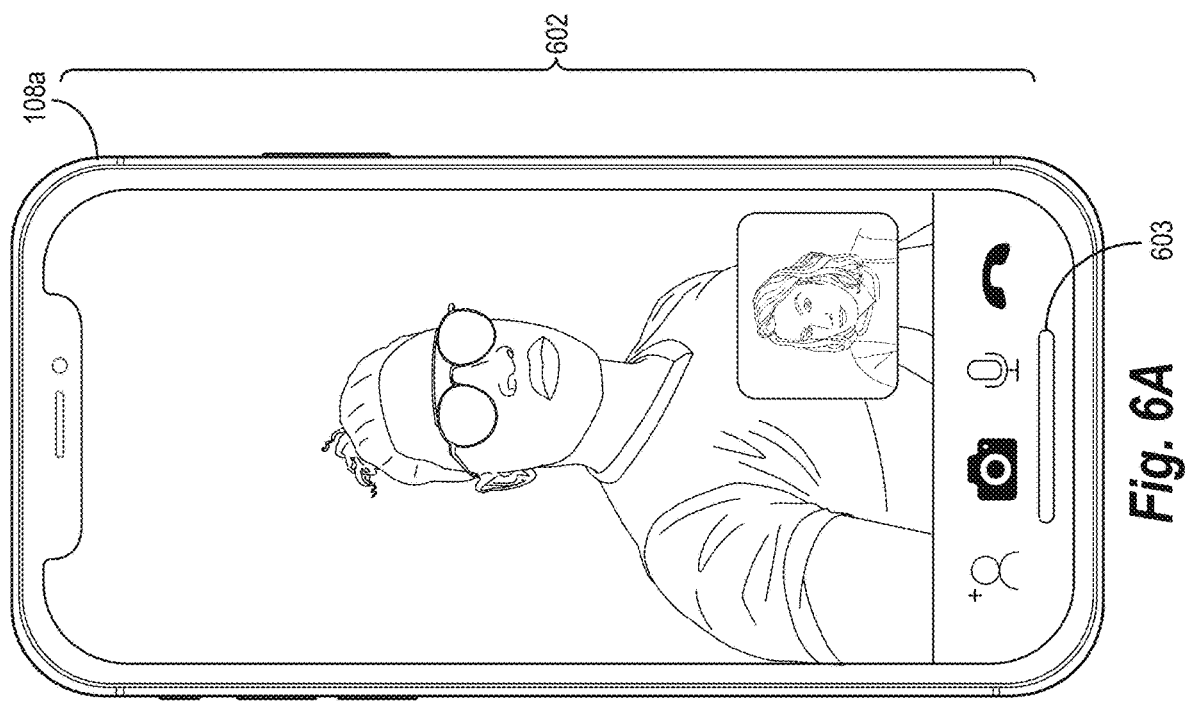
Figure 6C:
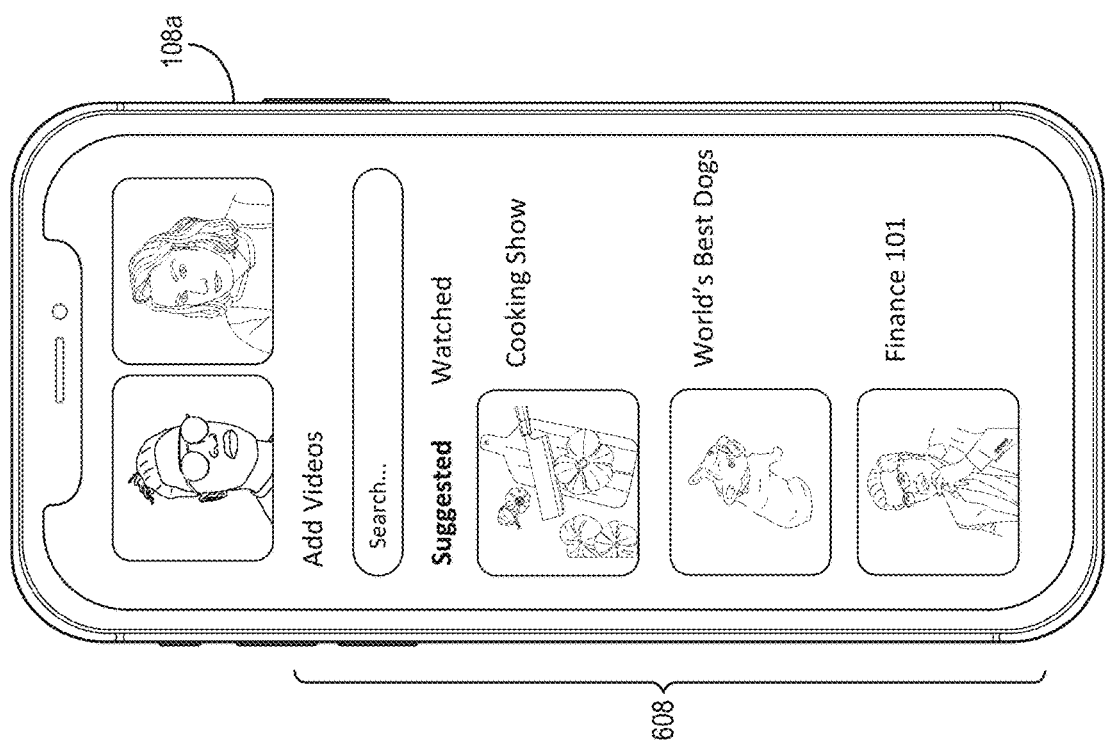

As mentioned, the video co-watching system 102 can provide a video chat interface for a consolidated live video stream and can initiate a presentation of co-watching digital video content across participant devices. In particular, the video co-watching system 102 can initiate a presentation of co-watching digital video content across the participant devices based on user interaction with a co-watching option within the video chat interface. FIGS. 6A-6C illustrate initiating a co-watching session from a video chat interface in accordance with one or more embodiments. In particular, FIGS. 6A-6C illustrate initiating a co-watching session to present co-watching digital video content hosted and provided by the video co-watching system 102.

As illustrated in FIG. 6A, the participant device 108a presents a consolidated live video stream within a video chat interface 602. In addition, the video chat interface 602 includes a selectable menu option 603. Based on user interaction to select (e.g., click, drag, or swipe) the menu option 603, the participant device 108a displays (or the video co-watching system 102 provides for display) a video chat menu. FIG. 6B illustrates the participant device 108a presenting a video chat menu 606 along with the consolidated live video stream 604 in accordance with one or more embodiments.

As illustrated in FIG. 6B, the video chat menu 606 includes selectable options to transfer a call ("Transfer Call"), create a sharable invite to invite other participant devices to join the video chat ("Create Invite"), initiate a co-watching session with the other participant devices (e.g., the participant device 108b) within the video chat ("Watch Together"), and share the display of the participant device 108a with other participant devices in the video chat ("Screen Share"). Based on user interaction with the co-watching option 607 ("Watch Together"), the participant device 108a displays (or the video co-watching system 102 provides for display) a co-watching digital video content selection menu. FIG. 6C illustrates the participant device 108a displaying a co-watching digital video content selection menu 608 in accordance with one or more embodiments.

As illustrated in FIG. 6C, the video co-watching system 102 provides and populates the co-watching digital video content selection menu 608 with items of co-watching digital video content from the video co-watching system 102. For example, the video co-watching system 102 provides selectable options of a "Cooking Show" video, a "World's Best Dogs" video, and a "Finance 101" video. In addition, the co-watching digital video content selection menu 608 includes a search option to search for co-watching digital video content. Upon identifying a user selection of one of the videos from the co-watching digital video content selection menu 608 (e.g., by receiving a co-watching digital video content identifier), the video co-watching system 102 provides the co-watching digital video content identifier for the selected video to other participant devices (e.g., the participant device 108b) within the video chat to cause the other participant devices to access and present the co-watching digital video content together with the video chat.

Figure 7B:
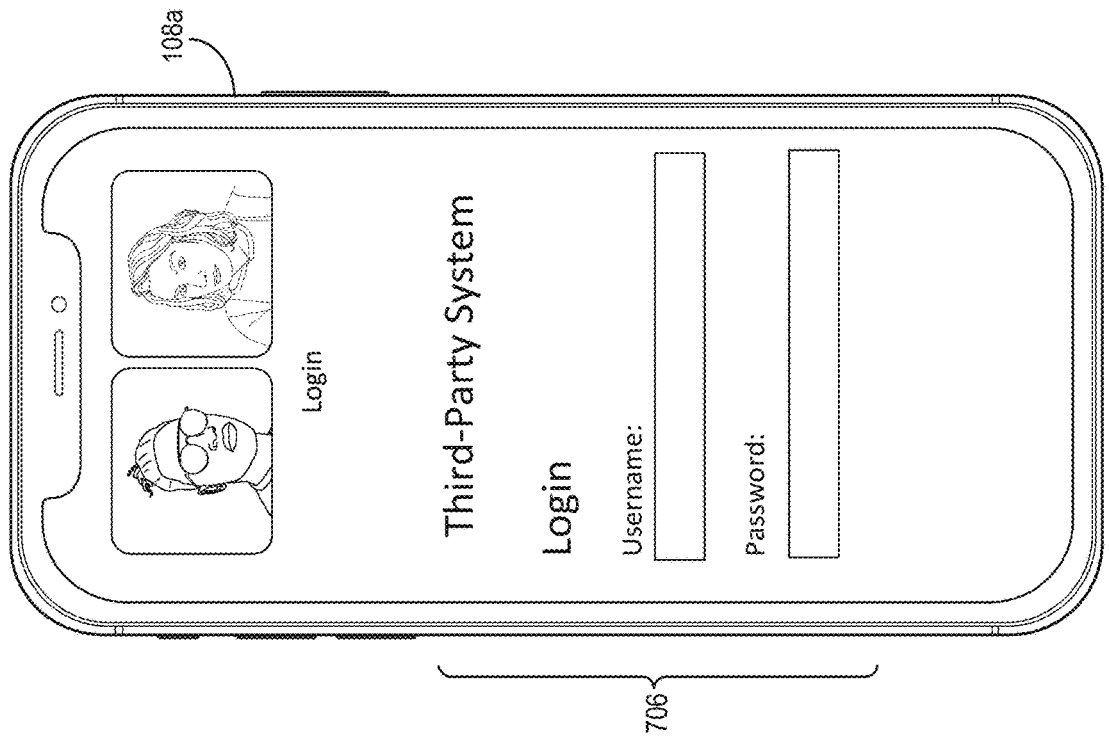
FIGS. 7A-7C illustrate another example series of user interfaces for initiating a co-watching session in accordance with one or more embodiments.
Figure 7A:
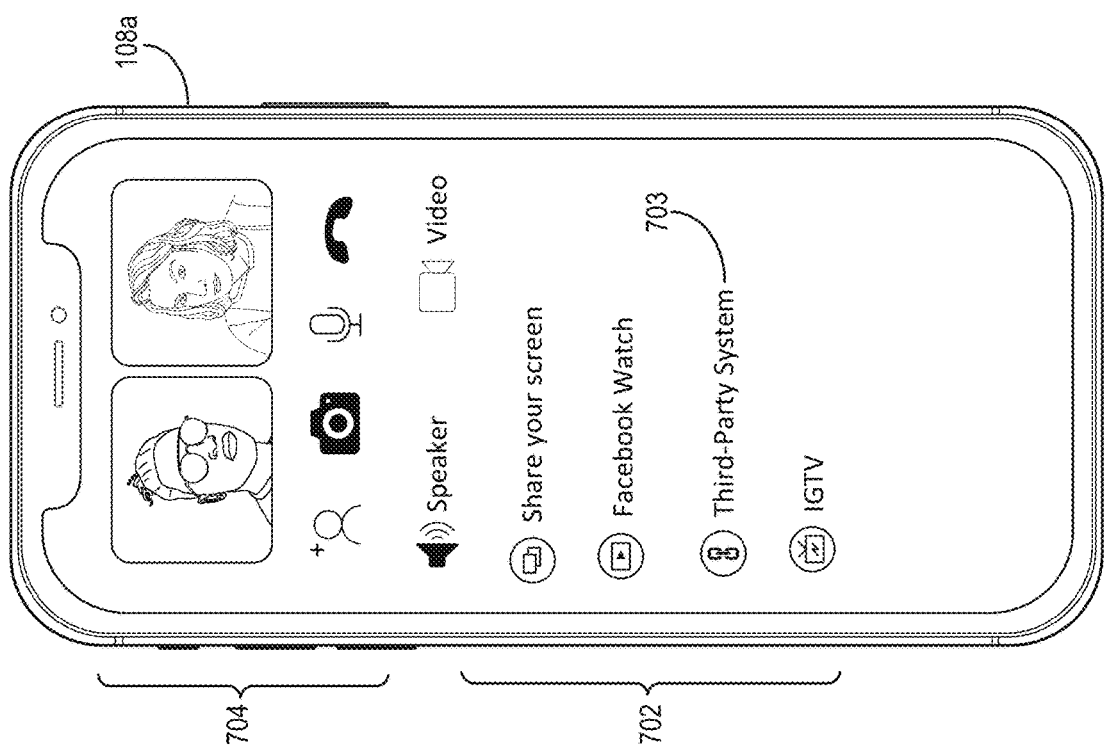
Figure 7C:
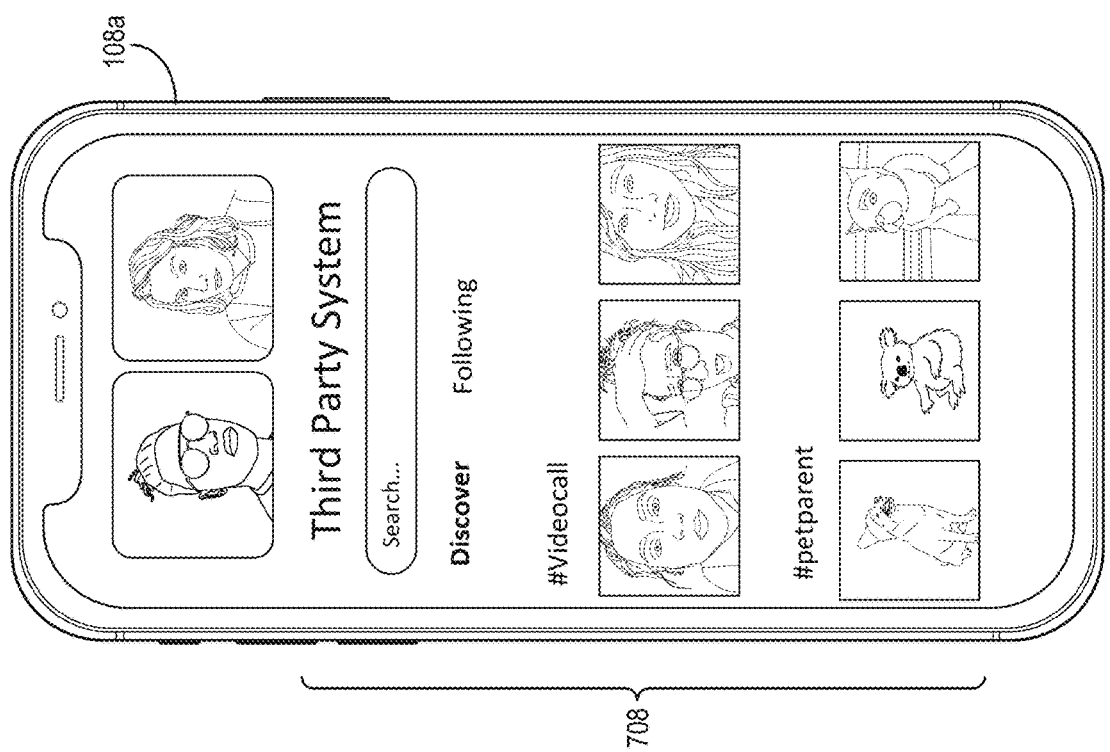

In addition (or alternatively) to enabling a participant device to initiate a co-watching session for co-watching digital video content hosted by the video co-watching system 102, the video co-watching system 102 can enable a participant device to initiate a co-watching session for co-watching digital video content hosted by a third-party system. In particular, the video co-watching system 102 can facilitate selection of co-watching digital video content from the third-party digital content provider system 112 to initiate a co-watching session. FIGS. 7A-7C illustrate initiating a co-watching session for third-party co-watching digital video content from a video chat interface in accordance with one or more embodiments.

As illustrated in FIG. 7A, the participant device 108*a* presents a consolidated live video stream 704 together with a video chat menu 702. Similar to the discussion above regarding FIGS. 6A-6C, the video chat menu 702 is accessible via user interaction with a menu option presented within a video chat interface for the consolidated live video stream 704. As shown, the video chat menu 702 includes various selectable options, including an option for initiating a co-watching session of third-party co-watching digital video content as well as options for initiating a co-watching session of co-watching digital video content from the video co-watching system 102. For instance, the video chat menu 702 includes a "Facebook Watch" option, an "IGTV" option, and a "Third-Party System" option.

Based on user interaction with the "Facebook Watch" option or the "IGTV" ("Instagram TV") option, the video co-watching system 102 provides a co-watching digital video content selection menu for selection of co-watching digital video content hosted by the video co-watching system 102 (or the social networking system 104). Based on user interaction with the third-party system option 703 ("Third-Party System"), by contrast, the video co-watching system 102 provides access to co-watching digital video content associated with the third-party digital content provider system 112.

In some embodiments, the video co-watching system 102 provides access to a login interface for the third-party digital content provider system 112 for the participant device 108*a* to gain access to the third-party co-watching digital video content. Indeed, the video co-watching system 102 accesses one or more APIs of the third-party digital content provider system 112 to integrate (or provide an access window to) a login interface from the third-party digital content provider system 112 via the video co-watching application 110. In some embodiments, the third-party digital content provider system 112 does not require login to access co-watching digital video content (or determines that the participant device 108*a* is already logged in), and instead provides access to co-watching digital video content based on user interaction with the third-party system option 703. FIG. 7B illustrates a login interface for accessing third-party co-watching digital video content in accordance with one or more embodiments.

As illustrated in FIG. 7B, the participant device 108*a* displays a login interface 706 for the third-party digital content provider system 112. In particular, the video co-watching system 102 provides access to the login interface 706 for the third-party digital content provider system 112 to enable the participant device 108*a* to interact with the third-party digital content provider system 112. Indeed, based on entry of third-party system credentials, the participant device 108*a* gains access to co-watching digital video content hosted by the third-party digital content provider system 112. For example, the video co-watching system 102 facilitates communication between the participant device 108*a* and the third-party digital content provider system 112 to log in and selected co-watching digital video content from a menu of the third-party digital content provider system 112. FIG. 7C illustrates a third-party co-watching digital video content selection menu in accordance with one or more embodiments.

As illustrated in FIG. 7C, the participant device 108*a* displays the third-party co-watching digital video content selection menu 708. The third-party co-watching digital video content selection menu 708 includes selectable items of co-watching digital video content presented as if the participant device 108*a* was displaying an interface of an application for the third-party digital content provider system 112. For example, the third-party co-watching digital video content selection menu 708 includes various themed videos such as "#Videocall" videos and "#petparent" videos. Indeed, the third-party co-watching digital video content selection menu 708 includes the displayed videos within a "Discover" pane associated with the third-party digital content provider system 112.

The third-party co-watching digital video content selection menu 708 also includes a "Following" pane selectable to display videos associated with users, topics, or accounts that a participant follows within the third-party digital content provider system 112. In some embodiments, the third-party co-watching digital video content selection menu 708 includes options for accessing other panes as well, such as a "Watched" pane (for videos previously viewed) and an "Uploads" pane (for videos uploaded by the participant). Further, the third-party co-watching digital video content selection menu 708 includes a search option to search for co-watching digital video content within the third-party digital content provider system 112 (e.g., within the co-watching digital video content database 114).

In response to user selection of a video from the "Discover" pane, the "Following" pane, or some other pane, the video co-watching system 102 causes the participant device 108*a* and the participant device 108*b* to present the selected digital video as co-watching digital video content. In particular, as described above, the video co-watching system 102 accesses (or receives) an encrypted co-watching digital video content identifier corresponding to the selected digital video and provides the encrypted co-watching digital video content identifier to participant device 108*b*. The video co-watching system 102 thus facilitates simultaneous co-watching of the digital video across the participant devices 108*a* and 108*b*.

Figure 8A:
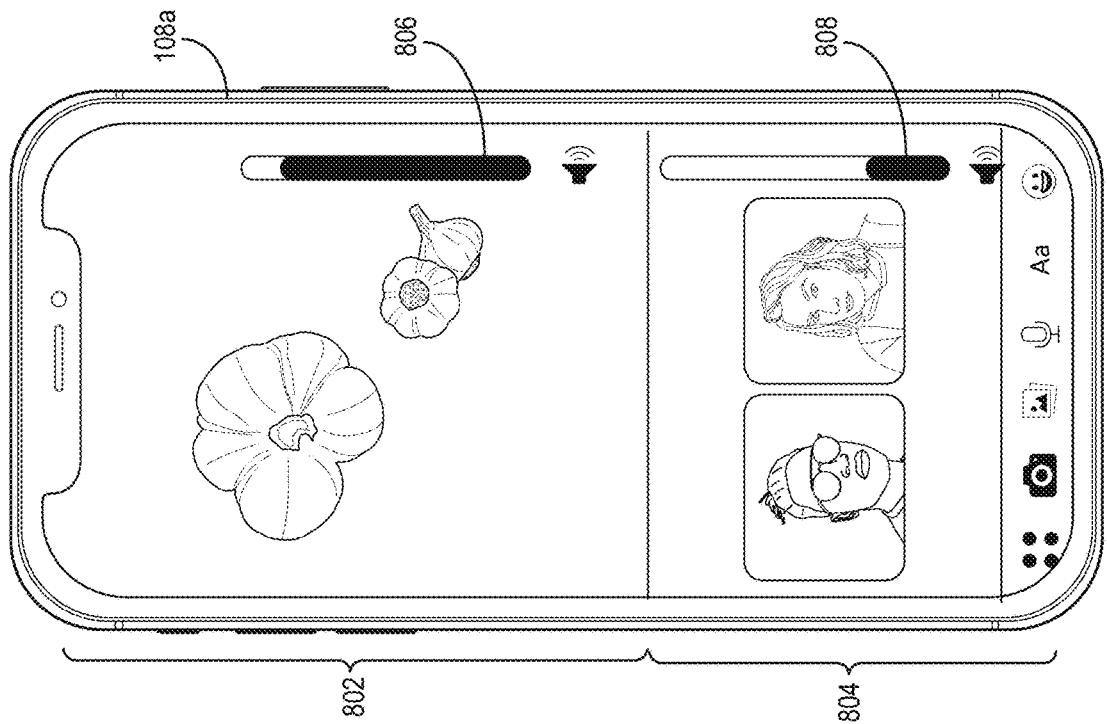
FIGS. 8A-8B illustrate example user interfaces depicting adjustments in volume settings in accordance with one or more embodiments.
Figure 8B:
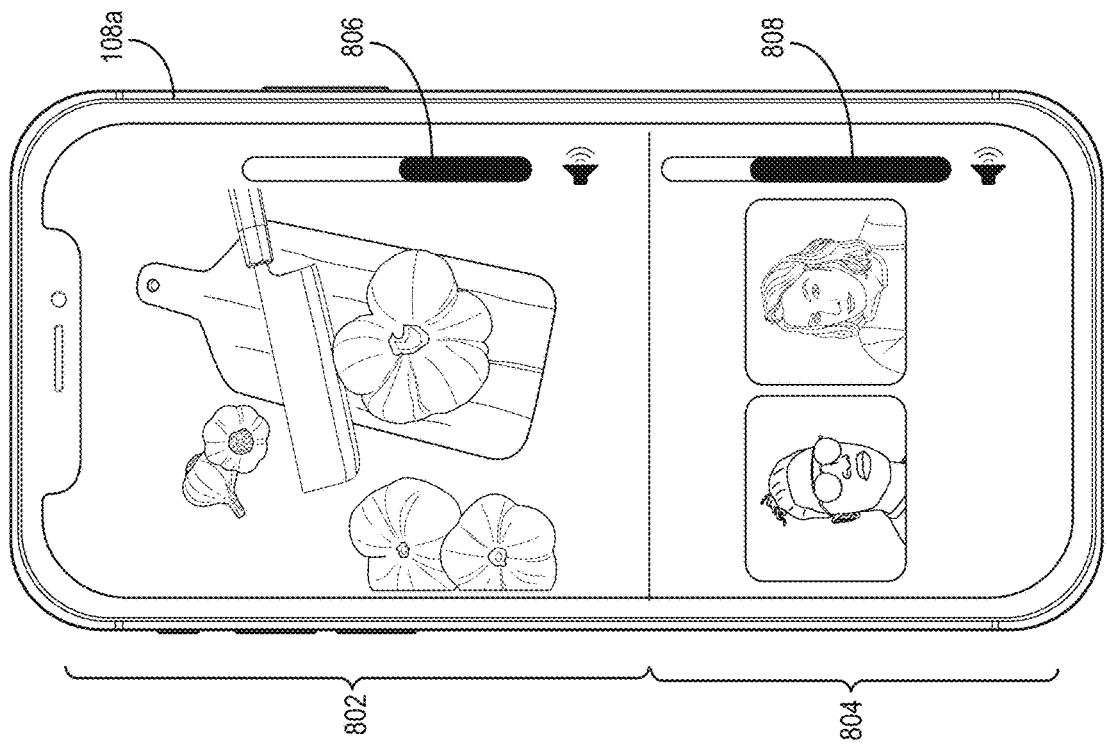

As mentioned above, the video co-watching system 102 can provide audio controls for a digital media player and for a consolidated live video stream. In particular, the video co-watching system 102 can modify a volume setting associated with a digital media player independently of a volume setting associated with a consolidated live video stream. FIGS. 8A-8B illustrate changing volume settings for a digital media player and a consolidated live video stream in accordance with one or more embodiments.

As illustrated in FIG. 8A, the participant device 108*a* displays a digital media player 802 and a consolidated live video stream 804 (e.g., as part of a synchronized digital content video chat interface). The digital media player 802 includes (or corresponds to) an audio control option 806, and the consolidated live video stream 804 includes (or corresponds to) an audio control option 808. Based on user interaction with the audio control option 806, the video co-watching system 102 adjusts (or causes the participant device 108*a* to adjust) the volume setting for the digital media player 802 while maintaining (or refraining from adjusting) the volume setting for the consolidated live video stream 804. Similarly, based on user interaction with the audio control option 808, the video co-watching system 102 adjusts (or causes the participant device 108*a* to adjust) the volume setting for the consolidated live video stream 804 while maintaining (or refraining from adjusting) the volume setting for the digital media player 802.

In some embodiments, the video co-watching system 102 automatically modifies volume settings. To elaborate, the video co-watching system 102 modifies a volume setting for the digital media player 802 and/or the consolidated live video stream 804 without user interaction. FIG. 8B illustrates the audio control option 806 and the audio control option 808 with different volume settings than in FIG. 8A in accordance with one or more embodiments. The volume settings illustrated in FIG. 8B are a result of either automatic adjustment by the video co-watching system 102 or based on user interaction.

As illustrated in FIG. 8B, the volume settings indicated by the audio control option 806 and the audio control option 808 are adjusted to increase the volume of the co-watching digital video content and decrease the volume of the consolidated live video stream 804. To automatically modify volume settings, the video co-watching system 102 determines or detects changes in an audio amplitude associated with the co-watching digital video content during playback (e.g., through louder and quieter parts of a video). For example, the video co-watching system 102 monitors audio amplitudes associated with a microphone of the participant device 108a and/or volume information associated with the co-watching digital video content. Based on volume changes during playback of the co-watching digital video content, the video co-watching system 102 adjusts the volume setting of the digital media player 802 and/or the consolidated live video stream 804 to keep both the co-watching digital video content and the consolidated live video stream 804 audible (or to emphasize one more than the other). In some embodiments, the video co-watching system 102 also (or alternatively) determines external noise around the participant device 108a based on background noise capture by a microphone and automatically modifies the volume setting to account for the background noise (e.g., by increasing volume of the digital media player 802 and/or the consolidated live video stream 804).

As shown in FIG. 8B, the co-watching digital video content has progressed to a different (and perhaps quieter) part during playback. Thus, the video co-watching system 102 automatically increases the volume of the digital media player 802 and decreases the volume of the consolidated live video stream 804 to, for example, maintain a constant volume ratio or disparity between the two. For instance, the video co-watching system 102 compares an average decibel level of the co-watching digital video content with an average decibel level of the consolidated live video stream 804 over a threshold period of time (e.g., 10 seconds or 30 seconds) and automatically adjusts volume settings to keep the ratio between the decibel levels the same (or within a threshold measure of change).

In some embodiments, the video co-watching system 102 monitors user interactions for volume adjustment over time and trains a machine learning model (e.g., a neural network) to automatically adjust volume settings based on learned user adjustments. To elaborate, the video co-watching system 102 trains the machine learning model over a set of training data that includes sample co-watching digital video content, sample video chat content, and ground-truth (e.g., user-defined) volume settings corresponding to the sample co-watching digital video content and the sample video chat content (e.g., including different ground-truth volume settings for different timestamps of the content that correspond to different audio amplitudes). Thus, the video co-watching system 102 can implement the trained machine learning model to automatically adjust volume settings as audio amplitudes change for co-watching digital video content and video chat content.

Figure 9:
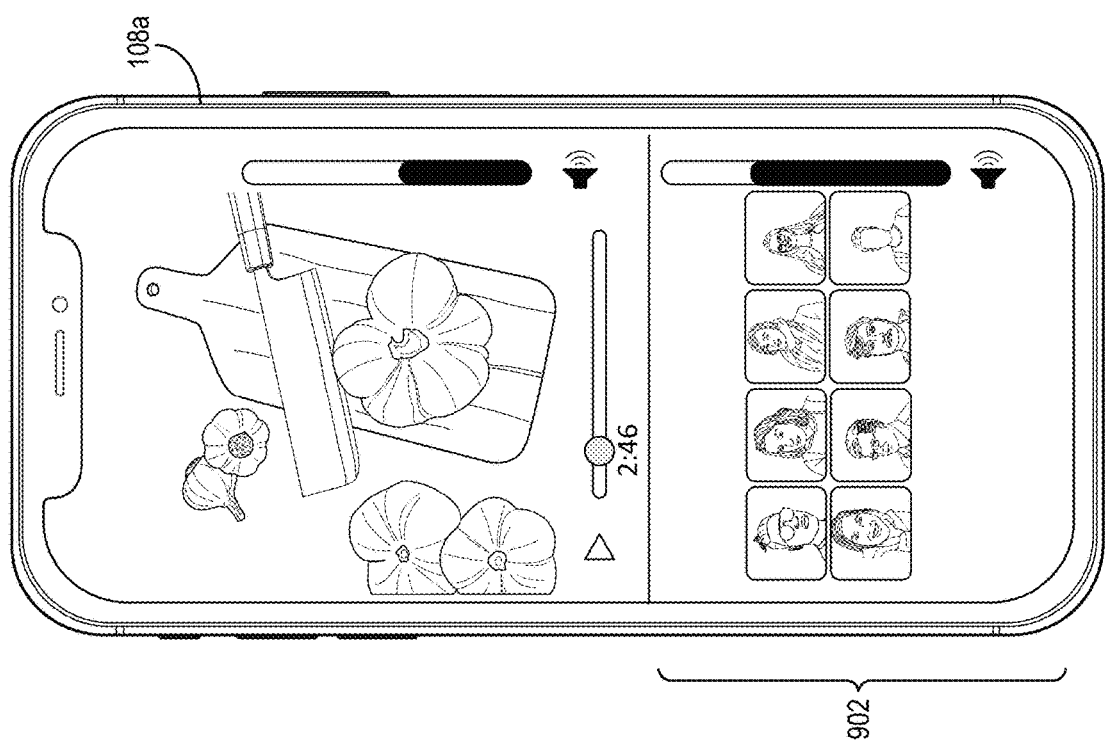
FIG. 9 illustrates a participant device engaged in a co-watching session with more than two participant devices in accordance with one or more embodiments.

As mentioned above, the video co-watching system 102 can accommodate more than two participant devices in a video chat. Indeed, the video co-watching system 102 can facilitate video chatting and presentation of co-watching digital video content across larger numbers of participant devices. FIG. 9 illustrates the participant device 108a displaying a synchronized digital content video chat interface that includes a digital media player and a consolidated live video stream 902 with more than two participants in accordance with one or more embodiments. As illustrated in FIG. 9, the consolidated live video stream 902 includes streams from eight participant devices participating in a group video chat.

As described above, the video co-watching system 102 can receive an indication of a playback modification from any of the participant deices corresponding to the eight participants in the video chat. Based on receiving the playback modification, the video co-watching system 102 can generate and provide a playback modifier signal (e.g., nested within live video stream data) to the other participant devices to cause the participant devices to perform the modification and continue with synchronized playback of the co-watching digital video content. Indeed, the video co-watching system 102 can cause the participant devices to perform the modification while also providing the consolidated live video stream 902 to the participant devices.

Figure 10:
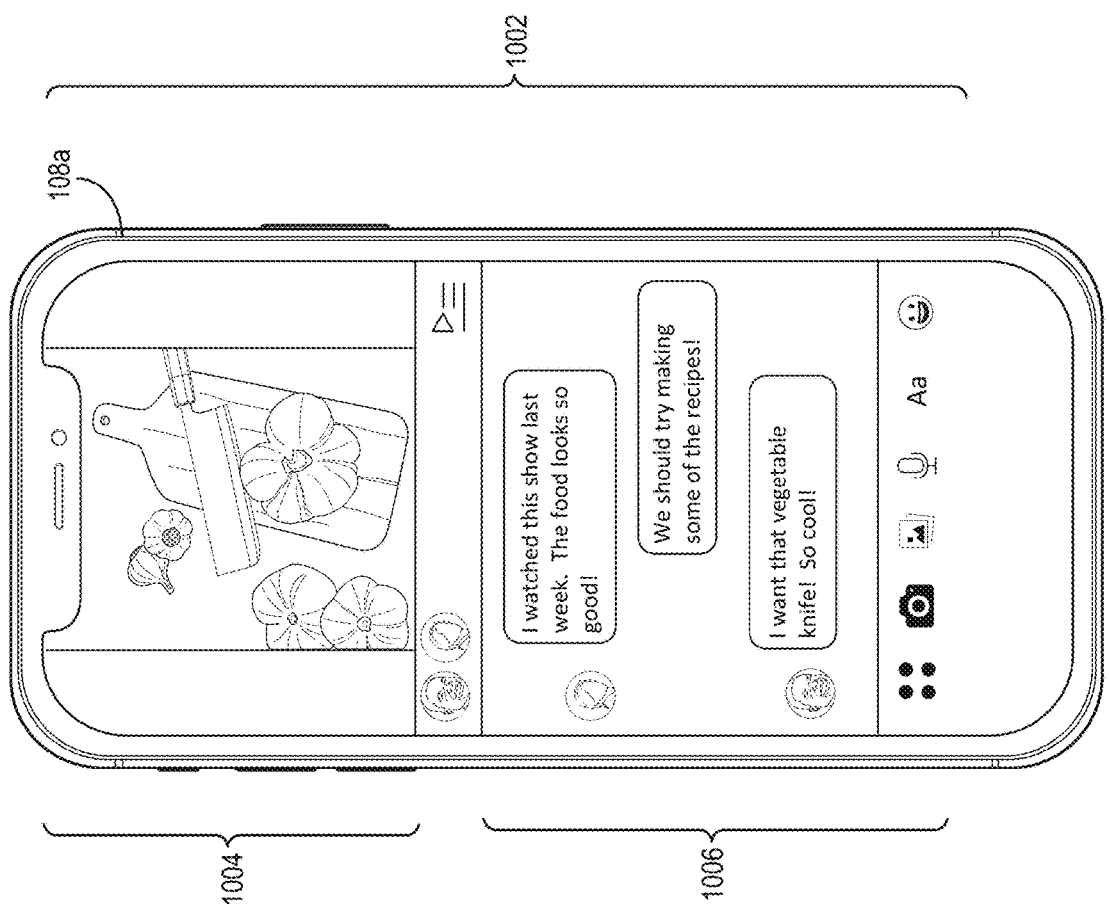
FIG. 10 illustrates a participant device engaged in a co-watching session together with a messaging session in accordance with one or more embodiments.

In one or more embodiments, the video co-watching system 102 can provide a digital media player together with a messaging interface. More specifically, rather than providing a synchronized digital content video chat interface, the video co-watching system 102 provides a synchronized digital content messaging interface that includes a digital media player and a messaging interface. FIG. 10 illustrates the participant device 108a displaying a synchronized digital content video chat interface 1002 that includes a digital media player 1004 and a messaging interface 1006.

As shown in FIG. 10, the messaging interface 1006 includes messages for a group message thread. The video co-watching system 102 thus facilitates the participant devices 108a and 108b to message each other while simultaneously presenting co-watching digital video content via the digital media player 1004. The messaging interface 1006 can present messages, images, attachments, and other content shared by participant devices within a group message thread.

For simultaneous presentation with group video chats and/or message threads, in some embodiments, the video co-watching system 102 facilitates co-listening to music. For example, the third-party digital content provider system 112 can refer to a music streaming service from which the video co-watching system 102 (or participant devices) can access music streams for playing together in a co-listening session. Thus, the video co-watching system 102 can synchronize playback of the co-listening music content as described above in relation to the third-party digital content provider system—by transmitting a playback modifier signal to participant devices based on identifying a playback modification.

Figure 11:
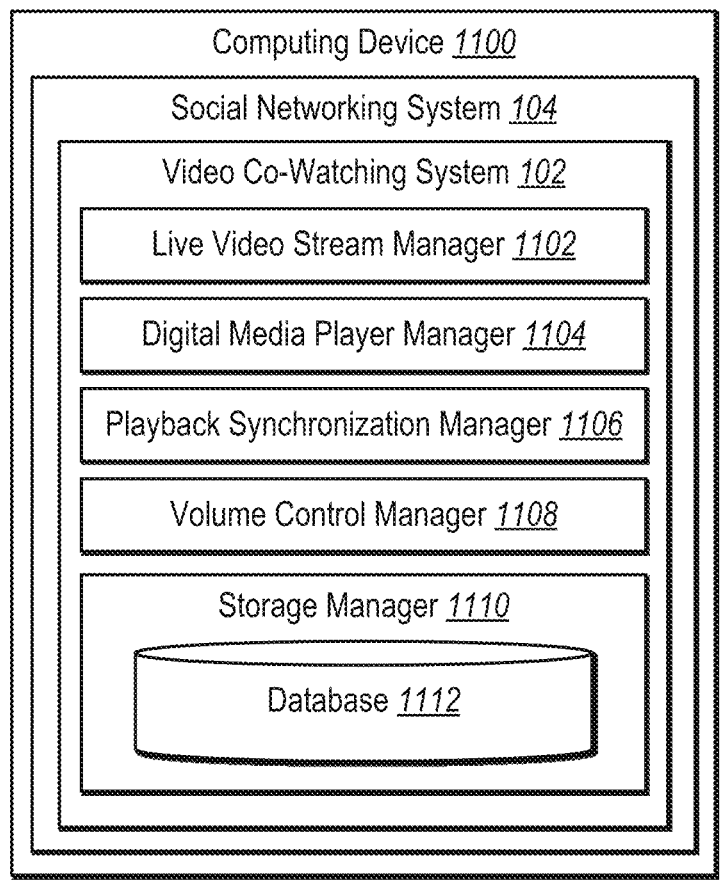
FIG. 11 illustrates an example schematic diagram of a computing device including various components of a video co-watching system in accordance with one or more embodiments.

Looking now to FIG. 11, additional detail will be provided regarding components and capabilities of the video co-watching system 102. Specifically, FIG. 11 illustrates an example schematic diagram of the video co-watching system 102 on an example computing device 1100 (e.g., one or more of the participant devices 108a-108b, and/or the server(s) 106). As shown in FIG. 11, the video co-watching system 102 may include a live video stream manager 1102, a digital media player manager 1104, a playback synchronization manager 1106, a volume control manager 1108, and a storage manager 1110.

As mentioned, the video co-watching system 102 includes a live video stream manager 1102. In particular, the live video stream manager 1102 manages, maintains, provides, transmits, streams, receives, relays, or presents live video streams for a video chat between participant devices. For example, the live video stream manager 1102 receives and provides live video streams captured by participant devices for display within a consolidated live video stream.

In addition, the video co-watching system 102 includes a digital media player manager 1104. In particular, the digital media player manager 1104 manages, maintains, provides, displays, accesses, or integrates a digital media player as part of a synchronized digital content video chat interface. For example, the digital media player manager 1104 receives indications of user interactions with playback controls to modify playback of co-watching digital video content. The digital media player manager 1104 modifies playback of co-watching digital video content based on user interactions with the playback controls.

Further, the video co-watching system 102 includes a playback synchronization manager 1106. In particular, the playback synchronization manager 1106 manages, maintains, identifies, determines, or synchronizes playback of co-watching digital video content. For example, the playback synchronization manager 1106 receives a playback modifier signal from a participant device or from a third-party digital content provider system. The playback synchronization manager 1106 further provides the playback modifier signal to other participant devices to cause the digital media players at the participant devices to perform the corresponding modification to playback of the co-watching digital video content.

As shown, the video co-watching system 102 also includes a volume control manager 1108. In particular, the volume control manager 1108, manages, maintains, determines, detects, receives, identifies, adjusts, modifies, or changes volume settings associated with a digital media player and/or a consolidated live video stream. For example, the volume control manager 1108 determines volume changes of co-watching digital video content during playback and modifies volume settings based on the changes, as described above. In some embodiments, the volume control manager 1108 identifies user interaction to adjust a volume setting of either a digital media player or a consolidated live video stream. The volume control manager 1108 thus modifies the corresponding volume setting while maintaining other volume settings.

As also shown, the video co-watching system 102 includes a storage manager 1110. In particular, the storage manager 1110 manages, maintains, receives, provides, determines, or identifies information for participant devices and/or co-watching digital video content. Indeed, in embodiments where the video co-watching system 102 hosts and provides co-watching digital video content, the storage manager 1110 stores co-watching digital video content within the database 1112 to provide to participant devices for playback during co-watching sessions. The storage manager 1110 further manages information such as storing and distributing playback modifier signals, live digital video streams, co-watching digital video content identifiers (encrypted or otherwise), and volume information within the database 1112.

In one or more embodiments, each of the components of the video co-watching system 102 are in communication with one another using any suitable communication technologies. Additionally, the components of the video co-watching system 102 can be in communication with one or more other devices including one or more client devices described above. It will be recognized that although the components of the video co-watching system 102 are shown to be separate in FIG. 11, any of the subcomponents may be combined into fewer components, such as into a single component, or divided into more components as may serve a particular implementation. Furthermore, although the components of FIG. 11 are described in connection with the video co-watching system 102, at least some of the components for performing operations in conjunction with the video co-watching system 102 described herein may be implemented on other devices within the environment.

The components of the video co-watching system 102 can include software, hardware, or both. For example, the components of the video co-watching system 102 can include one or more instructions stored on a computer-readable storage medium and executable by processors of one or more computing devices (e.g., the computing device 1100). When executed by the one or more processors, the computer-executable instructions of the video co-watching system 102 can cause the computing device 900 to perform the methods described herein. Alternatively, the components of the video co-watching system 102 can comprise hardware, such as a special purpose processing device to perform a certain function or group of functions. Additionally or alternatively, the components of the video co-watching system 102 can include a combination of computer-executable instructions and hardware.

Furthermore, the components of the video co-watching system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the video co-watching system 102 may be implemented as part of a stand-alone application on a personal computing device or a mobile device. Alternatively or additionally, the components of the video co-watching system 102 may be implemented in any application that allows creation and delivery of marketing content to users, including, but not limited to, various applications.

FIGS. 1-11, the corresponding text, and the examples provide a number of different systems, methods, and non-transitory computer readable media for providing and synchronizing co-watching digital video content to participant devices for simultaneous presentation with a consolidated live video stream. In addition to the foregoing, embodiments can also be described in terms of flowcharts comprising acts for accomplishing a particular result. For example, FIG. 12 illustrates a flowchart of an example sequence of acts in accordance with one or more embodiments.

Figure 12:
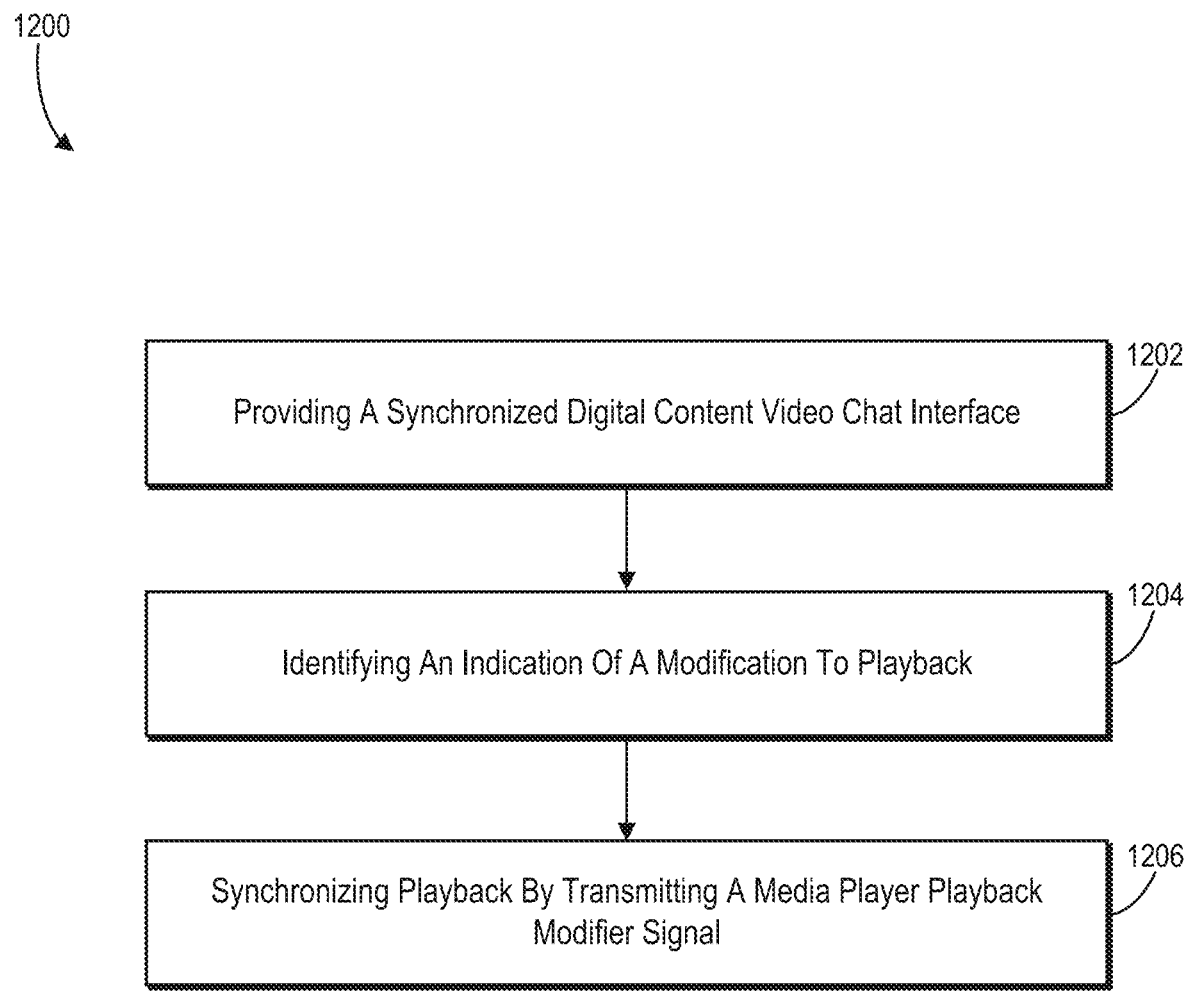
FIG. 12 illustrates an example flow of acts for providing and synchronizing co-watching digital video content to participant devices for simultaneous presentation with a consolidated live video stream in accordance with one or more embodiments.

While FIG. 12 illustrates acts according to some embodiments, alternative embodiments may omit, add to, reorder, and/or modify any of the acts shown in FIG. 12. The acts of FIG. 12 can be performed as part of a method. Alternatively, a non-transitory computer readable medium can comprise instructions, that when executed by one or more processors, cause a computing device to perform the acts of FIG. 12. In still further embodiments, a system can perform the acts of FIG. 12. Additionally, the acts described herein may be repeated or performed in parallel with one another or in parallel with different instances of the same or other similar acts.

FIG. 12 illustrates an example series of acts 1200 for providing and synchronizing co-watching digital video content to participant devices for simultaneous presentation with a consolidated live video stream. As illustrated in FIG. 12, the series of acts 1200 includes an act 1202 of providing a synchronized digital content video chat interface. In particular, the act 1202 can involve providing, for display to a first participant device and a second participant device, a synchronized digital content video chat interface that includes a consolidated live video stream comprising live video streams from the first participant device and the second participant device, and a digital media player portraying a first stream of co-watching digital video content at the first participant device and a second stream of the co-watching digital video content at the second participant device.

The series of acts 1200 can include an act of providing, within the synchronized digital content video chat interface, a first audio control option for the consolidated live video stream and a second audio control option for the digital media player. In addition, the series of acts 1200 can include an act of, in response to user interaction with the first audio control option, modifying a volume setting associated with the consolidated live video stream while maintaining a volume setting associated with the digital media player. Further, the series of acts 1200 can include an act of, in response to user interaction with the second audio control option, modifying the volume setting associated with the digital media player while maintaining the volume setting associated with the consolidated live video stream. Additionally (or alternatively), the series of acts 1200 can include an act of determining, during playback of the co-watching digital video content, changes to a first volume setting associated with the co-watching digital video content and an act of, based on the changes to the first volume setting, adjusting a second volume setting associated with the consolidated live video stream such that the second volume setting is different than the first volume setting.

As also illustrated in FIG. 12, the series of acts 1200 includes an act 1204 of identifying an indication of a modification to playback. In particular, the act 1204 can involve identifying an indication of a modification to playback of the co-watching digital video content from the first participant device. The modification to the playback of the co-watching digital video content can include one or more of pausing the co-watching digital video content, fast-forwarding the co-watching digital video content, skipping to a new playback timestamp of the co-watching digital video content, or rewinding the co-watching digital video content at the first participant device and the second participant device.

Further, the series of acts 1200 includes an act 1206 of synchronizing playback by transmitting a media player playback modifier signal. In particular, the act 1206 can involve, based on the indication, synchronizing playback of the co-watching digital video content at the second participant device and the first participant device by transmitting a media player playback modifier signal to the second participant device that causes the digital media player of the second participant device to perform the modification to the second stream of the co-watching digital video content. For example, the act 1206 can involve receiving, from the third-party digital content provider system, a co-watching digital video content identifier based on user interaction selecting the co-watching digital video content at the first participant device and providing the co-watching digital video content identifier to the second participant device to cause the second participant device to stream the co-watching digital video content from the third-party digital content provider system. In some embodiments, the act 1206 involves nesting the media player playback modifier signal within live video stream data associated with the consolidated live video stream. In the same or other embodiments, the act 1206 involves synchronizing the playback of the co-watching digital video content by transmitting the media player playback modifier signal to cause the second participant device to perform the one or more of pausing the co-watching digital video content, fast-forwarding the co-watching digital video content, skipping to a new playback timestamp of the co-watching digital video content, or rewinding the co-watching digital video content.

The series of acts 1200 can include an act of providing the digital media player to the first participant device and the second participant device by integrating the digital media player from a third-party digital content provider system. In addition, the series of acts 1200 can include an act of providing access to the co-watching digital video content to the first participant device and the second participant device from the third-party digital content provider system.

Further, the series of acts 1200 can include an act of identifying, based on user interaction with the synchronized digital content video chat interface at the second participant device, an indication of a second modification to playback of the co-watching digital video content. The series of acts 1200 can also include an act of, based on the indication of the second modification to the playback of the co-watching digital video content, synchronizing playback of the co-watching digital video content at the first participant device and the second participant device by transmitting a second media player playback modifier signal to the first participant device that causes the digital media player of the first participant device to perform the second modification of the first stream of the co-watching digital video content while portraying the consolidated live video stream.

Additionally (or alternatively), the series of acts 1200 can include an act of receiving, based on user interaction during the consolidated live video stream, an indication to begin co-watching at the first participant device and the second participant device. Further, the series of acts 1200 can include an act of providing the synchronized digital content video chat interface based on the indication to begin co-watching.

In some embodiments, the series of acts 1200 includes an act of receiving, from the third-party digital content provider system, an encrypted co-watching digital video content identifier based on user interaction selecting the co-watching digital video content at the first participant device. In these or other embodiments, the series of acts 1200 includes an act of providing, without identifying additional information associated with the co-watching digital video content, the encrypted co-watching digital video content identifier to the second participant device to cause the second participant device to stream the co-watching digital video content from the third-party digital content provider system.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer-executable instructions may be, for example, binaries, intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
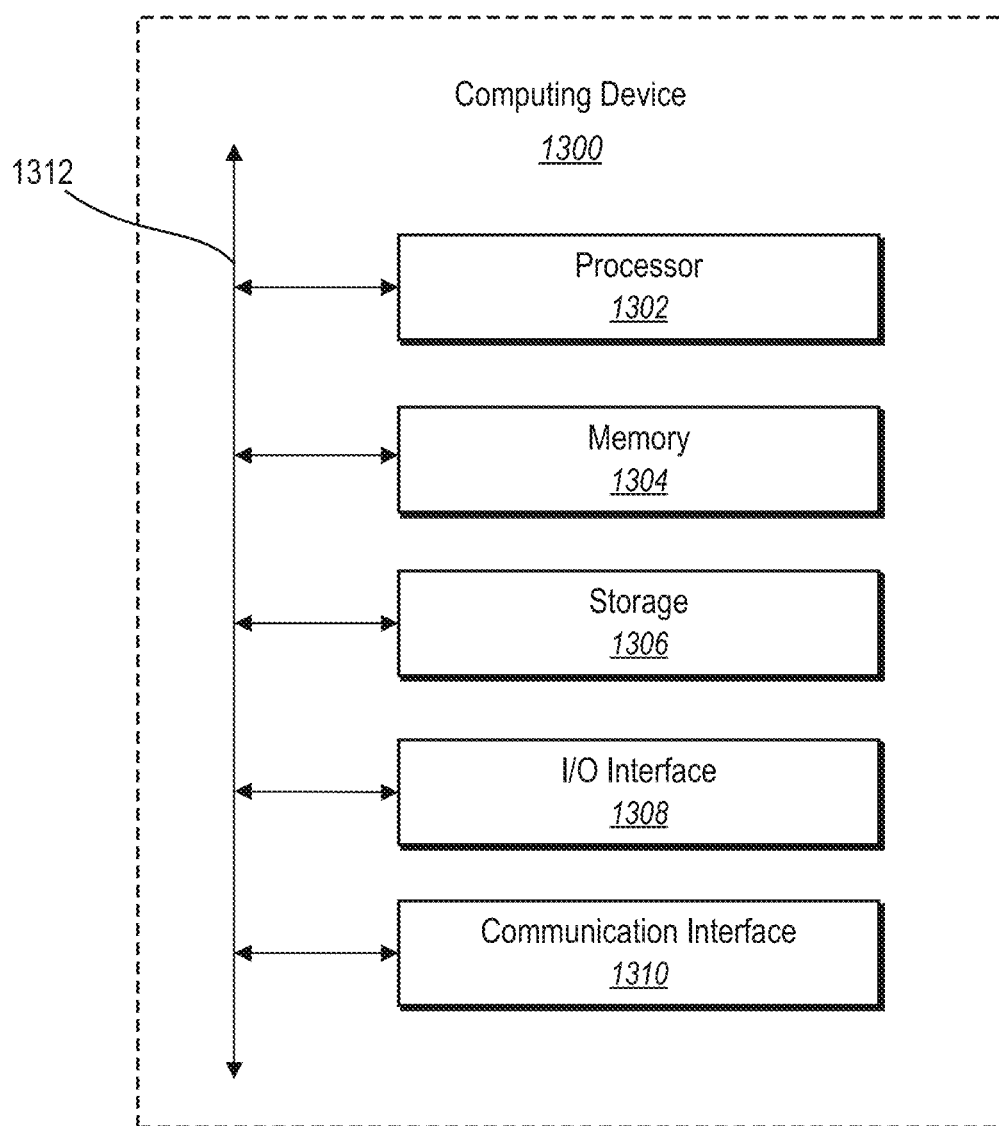
FIG. 13 illustrates a block diagram of an example computing device in accordance with one or more embodiments.

FIG. 13 illustrates a block diagram of an example computing device 1300 (e.g., the server(s) 106, the computing device 1100, and/or the participant devices 108a-108b) that may be configured to perform one or more of the processes described above. One will appreciate that one or more computing devices such as the computing device 1300 may implement the video co-watching system 102. As shown by FIG. 13, the computing device 1300 can comprise a processor 1302, a memory 1304, a storage device 1306, an I/O interface 1308, and a communication interface 1310, which may be communicatively coupled by way of a communication infrastructure 1312. While an example computing device 1300 is shown in FIG. 13, the components illustrated in FIG. 13 are not intended to be limiting. Additional or alternative components may be used in other embodiments. Furthermore, in certain embodiments, the computing device 1300 can include fewer components than those shown in FIG. 13. Components of the computing device 1300 shown in FIG. 13 will now be described in additional detail.

In one or more embodiments, the processor 1302 includes hardware for executing instructions, such as those making up a computer program. For example, to execute instructions, the processor 1302 may retrieve (or fetch) the instructions from an internal register, an internal cache, the memory 1304, or the storage device 1306 and decode and execute them. In one or more embodiments, the processor 1302 may include one or more internal caches for data, instructions, or addresses. For example, the processor 1302 may include one or more instruction caches, one or more data caches, and one or more translation lookaside buffers (TLBs). Instructions in the instruction caches may be copies of instructions in the memory 1304 or the storage device 1306.

The memory 1304 may be used for storing data, metadata, and programs for execution by the processor(s). The memory 1304 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1304 may be internal or distributed memory.

The storage device 1306 includes storage for storing data or instructions. For example, storage device 1306 can comprise a non-transitory storage medium described above. The storage device 1306 may include a hard disk drive (HDD), a floppy disk drive, flash memory, an optical disc, a magneto-optical disc, magnetic tape, or a Universal Serial Bus (USB) drive or a combination of two or more of these. The storage device 1306 may include removable or non-removable (or fixed) media, where appropriate. The storage device 1306 may be internal or external to the computing device 1300. In one or more embodiments, the storage device 1306 is non-volatile, solid-state memory. In other embodiments, the storage device 1306 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 1308 allows a user to provide input to, receive output from, and otherwise transfer data to and receive data from computing device 1300. The I/O interface 1308 may include a mouse, a keypad or a keyboard, a touch screen, a camera, an optical scanner, network interface, modem, another known I/O devices or a combination of such I/O interfaces. The I/O interface 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1308 is configured to provide graphical data to a display for presentation to a user. The graphical data may be representative of one or more graphical user interfaces and/or any other graphical content as may serve a particular implementation.

The communication interface 1310 can include hardware, software, or both. In any event, the communication interface 1310 can provide one or more interfaces for communication (e.g., packet-based communication) between the computing device 1300 and one or more other computing devices or networks. For example, the communication interface 1310 may include a network interface controller (NIC) or network adapter for communicating with an Ethernet or other wire-based network or a wireless NIC (WNIC) or wireless adapter for communicating with a wireless network, such as a WI-FI.

Additionally, or alternatively, the communication interface 1310 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 1310 may facilitate communications with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination thereof.

Additionally, the communication interface 1310 may facilitate communications across various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1312 may include hardware, software, or both that connects components of the computing device 1300 to each other. For example, the communication infrastructure 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the video co-watching system 102 can operate as a social networking system in various embodiments. In addition to the description given above, a social networking system may enable its users (such as persons or organizations) to interact with the system and with each other. The social networking system may, with input from a user, create and store in the social networking system a social media account associated with the user. The social media account may include demographic information, communication-channel information, and information on personal interests of the user. The social networking system may also, with input from a user, create and store a record of relationships of the user with other users of the social networking system, as well as provide services (e.g. wall posts, photo-sharing, online calendars and event organization, messaging, games, or advertisements) to facilitate social interaction between or among users.

Also, the social networking system may allow users to post photographs and other multimedia content items to a user's profile page (typically known as "wall posts" or "timeline posts") or in a photo album, both of which may be accessible to other users of the social networking system depending upon the user's configured privacy settings.

Figure 14:
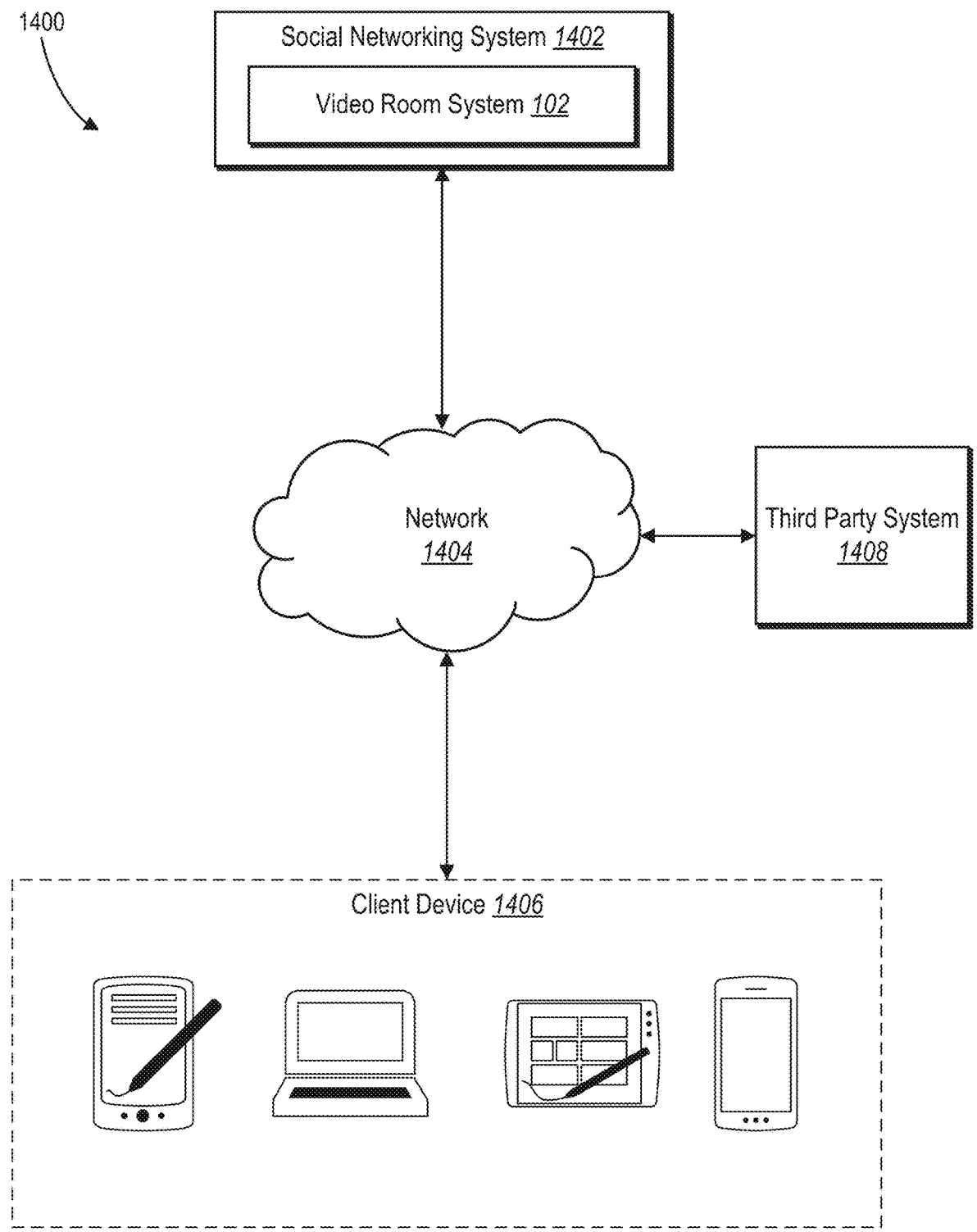
FIG. 14 illustrates an example network environment of a networking system in accordance with one or more embodiments.

FIG. 14 illustrates an example network environment 1400 of a networking system. The network environment 1400 includes a social networking system 1402 (e.g., the social networking system 104), a user device 1406, and a third-party system 1408 connected to each other by a network 1404. Although FIG. 14 illustrates a particular arrangement of the social networking system 1402, the user device 1406, the third-party system 1408, and the network 1404, this disclosure contemplates any suitable arrangement of the devices, systems, and networks. For example, the user device 1406 and the social networking system 1402 may be physically or logically co-located with each other in whole, or in part. Moreover, although FIG. 14 illustrates a single user device 1406, the social networking system 1402, the third-party system 1408, and the network 1404, this disclosure contemplates any suitable number of devices, systems, and networks.

This disclosure contemplates any suitable network. For example, one or more portions of the network 1404 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 1404 may include one or more networks.

Links may connect the social networking system 1402, the user device 1406, and the third-party system 1408 to the network 1404 or to each other. In particular embodiments, one or more links include one or more wireline (e.g., Digital Subscriber Line (DSL) or Data Over Cable Service Interface Specification (DOCSIS)), wireless (e.g., Wi-Fi or Worldwide Interoperability for Microwave Access (WiMAX)), or optical (e.g., Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout the network environment 1400. One or more first links may differ in one or more respects from one or more second links.

In particular embodiments, the user device 1406 may be an electronic device including hardware, software, or embedded logic components or a combination of two or more such components and capable of carrying out the appropriate functionalities implemented or supported by the user device 1406. For example, the user device 1406 may include any of the computing devices discussed above in relation to FIG. 11. The user device 1406 may enable a network user to access the network 1404. The user device 1406 may enable its user to communicate with other users associated with other user devices.

In particular embodiments, the user device 1406 may include a web browser, such as MICROSOFT INTERNET EXPLORER, GOOGLE CHROME, MOZILLA FIREFOX, APPLE SAFARI, and may have one or more add-ons, plug-ins, or other extensions (e.g., toolbars). A user at the user device 1406 may enter a Uniform Resource Locator (URL) or other address directing the web browser to a particular server (such as server, or a server associated with the third-party system 1408), and the web browser may generate a Hypertext Transfer Protocol (HTTP) request and communicate the HTTP request to server. The server may accept the HTTP request and communicate to the user device 1406 one or more Hypertext Markup Language (HTML) files responsive to the HTTP request.

The user device 1406 may render a webpage based on the HTML files from the server for presentation to the user. For example, webpages may render from HTML files, Extensible Hypertext Markup Language (XHTML) files, or Extensible Markup Language (XML) files, according to particular needs. Such pages may also execute scripts such as those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the social networking system 1402 may be a network-addressable computing system that can host an online network of users (e.g., a social networking system or an electronic messaging system). In some embodiments, such as the illustrated embodiment, the social networking system 1402 implements the video co-watching system 102.

The social networking system 1402 may generate, store, receive, and send networking data, such as user-profile data, concept-profile data, graph information (e.g., social-graph information), or other suitable data related to the online network of users. The social networking system 1402 may be accessed by the other components of network environment 1400 either directly or via the network 1404. In particular embodiments, the social networking system 1402 may include one or more servers. Each server may be a unitary server or a distributed server spanning multiple computers or multiple datacenters. Servers may be of various types, such as web server, news server, mail server, message server, advertising server, file server, application server, exchange server, database server, proxy server, another server suitable for performing functions or processes described herein, or any combination thereof.

In one or more embodiments, each server may include hardware, software, or embedded logic components or a combination of two or more such components for carrying out the appropriate functionalities implemented or supported by a server. In particular embodiments, the social networking system 1402 may include one or more data stores. Data stores may be used to store various types of information. In particular embodiments, the information stored in data stores may be organized according to specific data structures. In particular embodiments, each data store may be a relational, columnar, correlation, or another suitable database. Although this disclosure describes or illustrates particular types of databases, this disclosure contemplates any suitable types of databases. Particular embodiments may provide interfaces that enable the social networking system 1402, the user device 1406, or the third-party system 1408 to manage, retrieve, modify, add, or delete, the information stored in a data store.

In particular embodiments, the social networking system 1402 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. The social networking system 1402 may provide users of the online network of users the ability to communicate and interact with other users. In particular embodiments, users may join the online network of users via the social networking system 1402 and then add connections (e.g., relationships) to a number of other users of the social networking system 1402 whom they want to be connected to. Herein, the term "friend" may refer to any other user of the social networking system 1402 with whom a user has formed a connection, association, or relationship via the social networking system 1402.

In particular embodiments, the social networking system 1402 may provide users with the ability to take actions on various types of items or objects, supported by the social networking system 1402. For example, the items and objects may include groups or social networks to which users of the social networking system 1402 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social networking system 1402 or by an external system of the third-party system 1408, which is separate from the social networking system 1402 and coupled to the social networking system 1402 via the network 1404.

In particular embodiments, the social networking system 1402 may be capable of linking a variety of entities. For example, the social networking system 1402 may enable users to interact with each other as well as receive content from the third-party systems 1408 or other entities, or to allow users to interact with these entities through an application programming interfaces (API) or other communication channels.

In particular embodiments, the third-party system 1408 may include one or more types of servers, one or more data stores, one or more interfaces, including but not limited to APIs, one or more web services, one or more content sources, one or more networks, or any other suitable components, e.g., that servers may communicate with. The third-party system 1408 may be operated by a different entity from an entity operating the social networking system 1402. In particular embodiments, however, the social networking system 1402 and the third-party systems 1408 may operate in conjunction with each other to provide social networking services to users of the social networking system 1402 or the third-party systems 1408. In this sense, the social networking system 1402 may provide a platform, or backbone, which other systems, such as the third-party systems 1408, may use to provide social networking services and functionality to users across the Internet.

In particular embodiments, the third-party system 1408 may include a third-party content object provider. A third-party content object provider may include one or more sources of content objects, which may be communicated to a user device 1406. For example, content objects may include information regarding things or activities of interest to the user, such as movie showtimes, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social networking system 1402 also includes user-generated content objects, which may enhance a user's interactions with the social networking system 1402. User-generated content may include anything a user can add, upload, send, or "post" to the social networking system 1402. For example, a user communicates posts to the social networking system 1402 from a user device 1406. Posts may include data such as status updates or other textual data, location information, photos, videos, links, music or other similar data or media. Content may also be added to the social networking system 1402 by a third-party through a "communication channel," such as a newsfeed or stream.

In particular embodiments, the social networking system 1402 may include a variety of servers, sub-systems, programs, modules, logs, and data stores. In particular embodiments, the social networking system 1402 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social networking system 1402 may also include suitable components such as network interfaces, security mechanisms, load balancers, failover servers, management-and-network-operations consoles, other suitable components, or any suitable combination thereof. In particular embodiments, the social networking system 1402 may include one or more user-profile stores for storing social media accounts.

A social media account may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. For example, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes.

The connection information may also include user-defined connections between different users and content (both internal and external). A web server may be used for linking the social networking system 1402 to one or more user device 1406 or one or more the third-party system 1408 via the network 1404. The web server may include a mail server or other messaging functionality for receiving and routing messages between the social networking system 1402 and one or more user device 1406. An API-request server may allow the third-party system 1408 to access information from the social networking system 1402 by calling one or more APIs. An action logger may be used to receive communications from a web server about a user's actions on or off social networking system 1402. In conjunction with the action log, a third-party-content-object log may be maintained of user exposures to third-party-content objects. A notification controller may provide information regarding content objects to a user device 1406.

Information may be pushed to a user device 1406 as notifications, or information may be pulled from user device 1406 responsive to a request received from user device 1406. Authorization servers may be used to enforce one or more privacy settings of the users of the social networking system 1402. A privacy setting of a user determines how particular information associated with a user can be shared. The authorization server may allow users to opt in to or opt out of having their actions logged by the social networking system 1402 or shared with other systems (e.g., the third-party system 1408), such as by setting appropriate privacy settings. Third-party-content-object stores may be used to store content objects received from third parties, such as the third-party system 1408. Location stores may be used for storing location information received from user device 1406 associated with users. Advertisement-pricing modules may combine social information, the current time, location information, or other suitable information to provide relevant advertisements, in the form of notifications, to a user.

Figure 15:
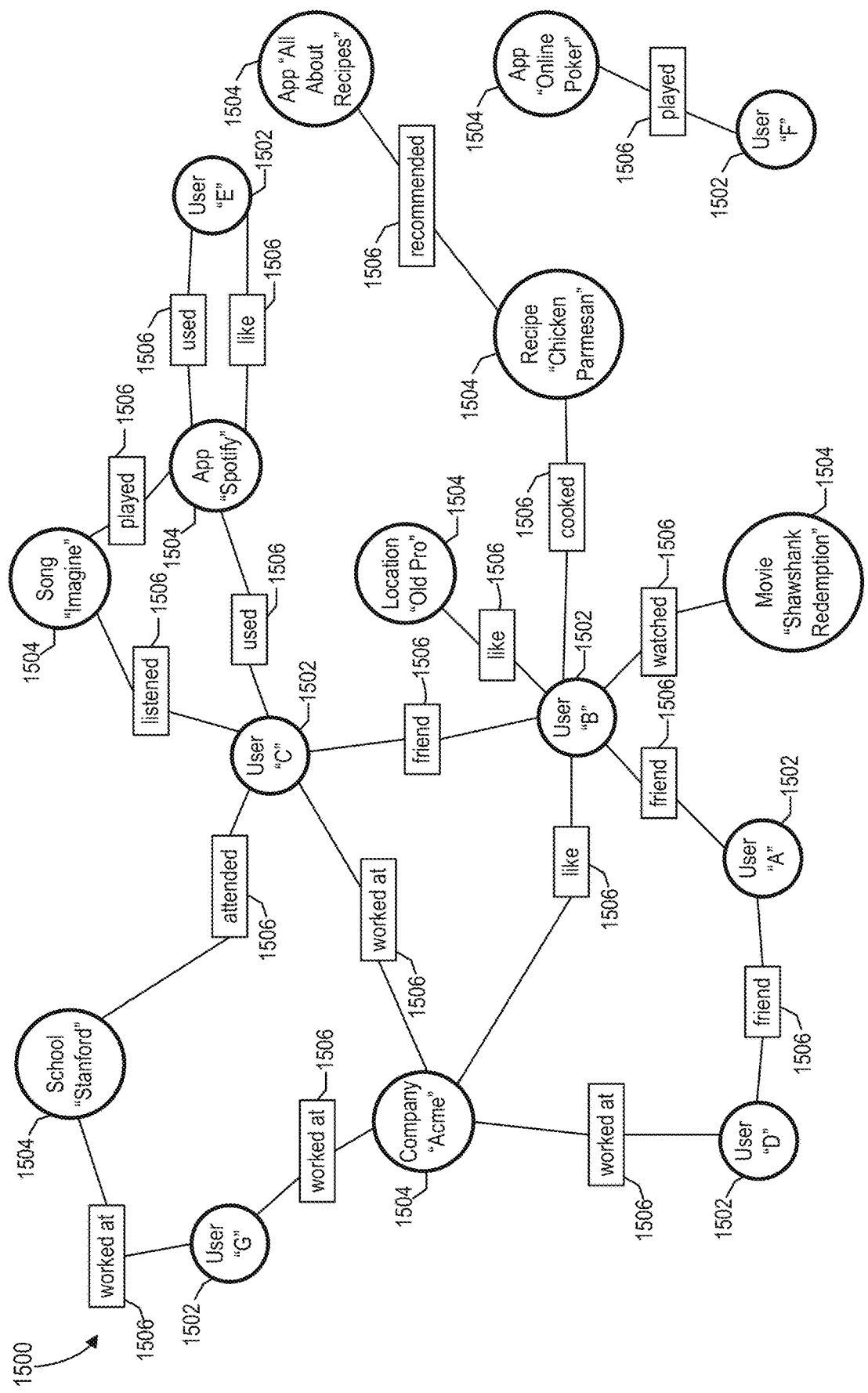
FIG. 15 illustrates a social graph in accordance with one or more embodiments.

FIG. 15 illustrates example social graph 1500. In particular embodiments, the social networking system 1402 may store one or more social graphs 1500 in one or more data stores. In particular embodiments, social graph 1500 may include multiple nodes—which may include multiple user nodes 1502 or multiple concept nodes 1504—and multiple edges 1506 connecting the nodes. Example social graph 1500 illustrated in FIG. 15 is shown, for didactic purposes, in a two-dimensional visual map representation. In particular embodiments, the social networking system 1402, the client device 1406, or the third-party system 1408 may access social graph 1500 and related social-graph information for suitable applications. The nodes and edges of social graph 1500 may be stored as data objects, for example, in a data store (such as a social-graph database). Such a data store may include one or more searchable or quarriable indexes of nodes or edges of social graph 1500.

In particular embodiments, a user node 1502 may correspond to a user of the social networking system 1402. For example, a user may be an individual (human user), an entity (e.g., an enterprise, business, or third-party application), or a group (e.g., of individuals or entities) that interacts or communicates with or over social networking system 1402. In particular embodiments, when a user registers for an account with the social networking system 1402, the social networking system 1402 may create a user node 1502 corresponding to the user and store the user node 1502 in one or more data stores. Users and user nodes 1502 described herein may, where appropriate, refer to registered users and user nodes 1502 associated with registered users.

In addition, or as an alternative, users and user nodes 1502 described herein may, where appropriate, refer to users that have not registered with the social networking system 1402. In particular embodiments, a user node 1502 may be associated with information provided by a user or information gathered by various systems, including the social networking system 1402. For example, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 1504 may correspond to a concept. For example, a concept may correspond to a place (e.g., a movie theater, restaurant, landmark, or city); a website (e.g., a website associated with social networking system 1402 or a third-party website associated with a web-application server); an entity (e.g., a person, business, group, sports team, or celebrity); a resource (e.g., an audio file, video file, digital photo, text file, structured document, or application) which may be located within the social networking system 1402 or on an external server, such as a web-application server; real or intellectual property (e.g., a sculpture, painting, movie, game, song, idea, photograph, or written work); a game; an activity; an idea or theory; another suitable concept; or two or more such concepts. A concept node 1504 may be associated with information of a concept provided by a user or information gathered by various systems, including the social networking system 1402. For example, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1504 may be associated with one or more data objects corresponding to information associated with concept node 1504. In particular embodiments, a concept node 1504 may correspond to one or more webpages.

In particular embodiments, a node in the social graph 1500 may represent or be represented by a webpage (which may be referred to as a "profile page"). Profile pages may be hosted by or accessible to the social networking system 1402. Profile pages may also be hosted on third-party websites associated with a third-party system 1408. For example, a profile page corresponding to a particular external webpage may be the particular external webpage, and the profile page may correspond to a particular concept node 1504. Profile pages may be viewable by all or a selected subset of other users. For example, a user node 1502 may have a corresponding user-profile page in which the corresponding user may add content, make declarations, or otherwise express himself or herself. As another example and not by way of limitation, a concept node 1504 may have a corresponding concept-profile page in which one or more users may add content, make declarations, or express themselves, particularly in relation to the concept corresponding to concept node 1504.

In particular embodiments, a concept node 1504 may represent a third-party webpage or resource hosted by the third-party system 1408. The third-party webpage or resource may include, among other elements, content, a selectable or another icon, or another inter-actable object (which may be implemented, for example, in JavaScript, AJAX, or PHP codes) representing an action or activity. For example, a third-party webpage may include a selectable icon such as "like," "check-in," "eat," "recommend," or another suitable action or activity. A user viewing the third-party webpage may perform an action by selecting one of the icons (e.g., "eat"), causing a client device 1406 to send to the social networking system 1402 a message indicating the user's action. In response to the message, the social networking system 1402 may create an edge (e.g., an "eat" edge) between a user node 1502 corresponding to the user and a concept node 1504 corresponding to the third-party webpage or resource and store edge 1506 in one or more data stores.

In particular embodiments, a pair of nodes in the social graph 1500 may be connected to each other by one or more edges 1506. An edge 1506 connecting a pair of nodes may represent a relationship between the pair of nodes. In particular embodiments, an edge 1506 may include or represent one or more data objects or attributes corresponding to the relationship between a pair of nodes. For example, a first user may indicate that a second user is a "friend" of the first user. In response to this indication, the social networking system 1402 may send a "friend request" to the second user. If the second user confirms the "friend request," social networking system 1402 may create an edge 1506 connecting the first user's user node 1502 to the second user's user node 1502 in the social graph 1500 and store edge 1506 as social-graph information in one or more of data stores. In the example of FIG. 15, social graph 1500 includes an edge 1506 indicating a friend relation between user nodes 1502 of user "A" and user "B" and an edge indicating a friend relation between user nodes 1502 of user "C" and user "B." Although this disclosure describes or illustrates particular edges 1506 with particular attributes connecting particular user nodes 1502, this disclosure contemplates any suitable edges 1506 with any suitable attributes connecting user nodes 1502. For example, an edge 1506 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 1500 by one or more edges 1506.

In particular embodiments, an edge 1506 between a user node 1502 and a concept node 1504 may represent a particular action or activity performed by a user associated with user node 1502 toward a concept associated with a concept node 1504. For example, as illustrated in FIG. 15, a user may "like," "attended," "played," "listened," "cooked," "worked at," or "watched" a concept, each of which may correspond to an edge type or subtype. A concept-profile page corresponding to a concept node 1504 may include, for example, a selectable "check-in" icon (e.g., a clickable "check-in" icon) or a selectable "add to favorites" icon. Similarly, after a user clicks these icons, the social networking system 1402 may create a "favorite" edge or a "check-in" edge in response to a user's action corresponding to a respective action.

As another example and not by way of limitation, a user (user "C") may listen to a particular song ("Ramble On") using a particular application (SPOTIFY, which is an online music application). In this case, the social networking system 1402 may create a "listened" edge 1506 and a "used" edge (as illustrated in FIG. 15) between user nodes 1502 corresponding to the user and concept nodes 1504 corresponding to the song and application to indicate that the user listened to the song and used the application.

Moreover, the social networking system 1402 may create a "played" edge 1506 (as illustrated in FIG. 15) between concept nodes 1504 corresponding to the song and the application to indicate that the particular song was played by the particular application. In this case, "played" edge 1506 corresponds to an action performed by an external application (SPOTIFY) on an external audio file (the song "Imagine"). Although this disclosure describes particular edges 1506 with particular attributes connecting user nodes 1502 and concept nodes 1504, this disclosure contemplates any suitable edges 1506 with any suitable attributes connecting user nodes 1502 and concept nodes 1504.

Furthermore, although this disclosure describes edges between a user node 1502 and a concept node 1504 representing a single relationship, this disclosure contemplates edges between a user node 1502 and a concept node 1504 representing one or more relationships. For example, an edge 1506 may represent both that a user likes and has used at a particular concept. Alternatively, another edge 1506 may represent each type of relationship (or multiples of a single relationship) between a user node 1502 and a concept node 1504 (as illustrated in FIG. 15 between user node 1502 for user "E" and concept node 1504 for "SPOTIFY").

In particular embodiments, the social networking system 1402 may create an edge 1506 between a user node 1502 and a concept node 1504 in the social graph 1500. For example, a user viewing a concept-profile page (e.g., by using a web browser or a special-purpose application hosted by the user's client device 1406) may indicate that he or she likes the concept represented by the concept node 1504 by clicking or selecting a "Like" icon, which may cause the user's client device 1406 to send to the social networking system 1402 a message indicating the user's liking of the concept associated with the concept-profile page.

In response to the message, the social networking system 1402 may create an edge 1506 between user node 1502 associated with the user and concept node 1504, as illustrated by "like" edge 1506 between the user and concept node 1504. In particular embodiments, the social networking system 1402 may store an edge 1506 in one or more data stores. In particular embodiments, an edge 1506 may be automatically formed by the social networking system 1402 in response to a particular user action. For example, if a first user uploads a picture, watches a movie, or listens to a song, an edge 1506 may be formed between user node 1502 corresponding to the first user and concept nodes 1504 corresponding to those concepts. Although this disclosure describes forming particular edges 1506 in particular manners, this disclosure contemplates forming any suitable edges 1506 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition, or as an alternative, an advertisement may be one or more sponsored stories (e.g., a news-feed or ticker item on the social networking system 1402)

A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a predetermined area of a profile page of a user or other page, presented with additional information associated with the advertiser, bumped up or otherwise highlighted within news feeds or tickers of other users, or otherwise promoted. The advertiser may pay to have the social action promoted. For example, advertisements may be included among the search results of a search-results page, where sponsored content is promoted over non-sponsored content.

In particular embodiments, an advertisement may be requested for display within social networking system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition, or as an alternative, an advertisement may be displayed within an application. An advertisement may be displayed within dedicated pages, requiring the user to interact with or watch the advertisement before the user may access a page or utilize an application. For example, the user may view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, the social networking system 1402 may execute or modify a particular action of the user.

An advertisement may also include social networking-system functionality that a user may interact with. For example, an advertisement may enable a user to "like" or otherwise endorse the advertisement by selecting an icon or link associated with the endorsement. As another example and not by way of limitation, an advertisement may enable a user to search (e.g., by executing a query) for content related to the advertiser. Similarly, a user may share the advertisement with another user (e.g., through the social networking system 1402) or RSVP (e.g., through the social networking system 1402) to an event associated with the advertisement. In addition, or as an alternative, an advertisement may include a social networking system context directed to the user. For example, an advertisement may display information about a friend of the user within the social networking system 1402 who has taken an action associated with the subject matter of the advertisement.

In particular embodiments, the social networking system 1402 may determine the social-graph affinity (which may be referred to herein as "affinity") of various social-graph entities for each other. Affinity may represent the strength of a relationship or level of interest between particular objects associated with the online network of users, such as users, concepts, content, actions, advertisements, other objects associated with the online network of users, or any suitable combination thereof. Affinity may also be determined with respect to objects associated with the third-party systems 1408 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social networking system 1402 may measure or quantify social-graph affinity using an affinity coefficient (which may be referred to herein as "coefficient"). The coefficient may represent or quantify the strength of a relationship between particular objects associated with the online network of users. The coefficient may also represent a probability or function that measures a predicted probability that a user will perform a particular action based on the user's interest in the action. In this way, a user's future actions may be predicted based on the user's prior actions, where the coefficient may be calculated at least in part based on the history of the user's actions. Coefficients may be used to predict any number of actions, which may be within or outside of the online network of users. For example, these actions may include various types of communications, such as sending messages, posting content, or commenting on content; various types of an observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social networking system 1402 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static, or the weights may change according to, for example, the user, the type of relationship, the type of action, the user's location, and so forth. Ratings for the factors may be combined according to their weights to determine an overall coefficient for the user. For example, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 1402 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. For example, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social networking system 1402 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social networking system 1402 may calculate a coefficient based on a user's actions. The social networking system 1402 may monitor such actions on the online network of users, on the third-party system 1408, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, the social networking system 1402 may calculate a coefficient based on the user's actions with particular types of content. The content may be associated with the online network of users, the third-party system 1408, or another suitable system. The content may include users, profile pages, posts, news stories, headlines, instant messages, chat room conversations, emails, advertisements, pictures, video, music, other suitable objects, or any combination thereof. The social networking system 1402 may analyze a user's actions to determine whether one or more of the actions indicate an affinity for the subject matter, content, other users, and so forth. For example, if a user may make frequently posts content related to "coffee" or variants thereof, the social networking system 1402 may determine the user has a high coefficient with respect to the concept "coffee." Particular actions or types of actions may be assigned a higher weight and/or rating than other actions, which may affect the overall calculated coefficient. For example, if a first user emails a second user, the weight or the rating for the action may be higher than if the first user views the user-profile page for the second user.

In particular embodiments, the social networking system 1402 may calculate a coefficient based on the type of relationship between particular objects. Referencing the social graph 1500, the social networking system 1402 may analyze the number and/or type of edges 1506 connecting particular user nodes 1502 and concept nodes 1504 when calculating a coefficient. For example, user nodes 1502 that are connected by a spouse-type edge (representing that the two users are married) may be assigned a higher coefficient than a user nodes 1502 that are connected by a friend-type edge. In other words, depending upon the weights assigned to the actions and relationships for the particular user, the overall affinity may be determined to be higher for content about the user's spouse than for content about the user's friend.

In particular embodiments, the relationships a user has with another object may affect the weights and/or the ratings of the user's actions with respect to calculating the coefficient for that object. For example, if a user is tagged in a first photo, but merely likes a second photo, the social networking system 1402 may determine that the user has a higher coefficient with respect to the first photo than the second photo because having a tagged-in-type relationship with content may be assigned a higher weight and/or rating than having a like-type relationship with content.

In some embodiments, the social networking system 1402 may calculate a coefficient for a first user based on the relationship one or more second users have with a particular object. In other words, the connections and coefficients other users have with an object may affect the first user's coefficient for the object. For example, if a first user is connected to or has a high coefficient for one or more second users, and those second users are connected to or have a high coefficient for a particular object, the social networking system 1402 may determine that the first user should also have a relatively high coefficient for the particular object.

In one or more embodiments, the coefficient may be based on the degree of separation between particular objects. The degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends."

Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 1500. For example, social-graph entities that are closer in the social graph 1500 (i.e., fewer degrees of separation) may have a higher coefficient than entities that are further apart in the social graph 1500.

In particular embodiments, the social networking system 1402 may calculate a coefficient based on location information. Objects that are geographically closer to each other may be considered to be more related, or of more interest, to each other than more distant objects. In some embodiments, the coefficient of a user towards a particular object may be based on the proximity of the object's location to a current location associated with the user (or the location of a client device 1406 of the user). A first user may be more interested in other users or concepts that are closer to the first user. For example, if a user is one mile from an airport and two miles from a gas station, the social networking system 1402 may determine that the user has a higher coefficient for the airport than the gas station based on the proximity of the airport to the user.

In particular embodiments, the social networking system 1402 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social networking system 1402 may provide information that is relevant to a user's interests and current circumstances, increasing the likelihood that they will find such information of interest.

In some embodiments, the social networking system 1402 may generate content based on coefficient information. Content objects may be provided or selected based on coefficients specific to a user. For example, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object.

In one or more embodiments, the social networking system 1402 may generate search results based on coefficient information. The search results for a particular user may be scored or ranked based on the coefficient associated with the search results with respect to the querying user. For example, search results corresponding to objects with higher coefficients may be ranked higher on a search-results page than results corresponding to objects having lower coefficients.

In particular embodiments, the social networking system 1402 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online network of users, from the third-party system 1408 (e.g., via an API or another communication channel), or from another suitable system. In response to the request, the social networking system 1402 may calculate the coefficient (or access the coefficient information if it has previously been calculated and stored).

In various embodiments, the social networking system 1402 may measure an affinity with respect to a particular process. Different processes (both internal and external to the online network of users) may request a coefficient for a particular object or set of objects. The social networking system 1402 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed Aug. 11, 2006, U.S. patent application Ser. No. 12/977,027, filed Dec. 22, 2010, U.S. patent application Ser. No. 12/978,265, filed Dec. 23, 2010, and U.S. patent application Ser. No. 13/632,869, filed Oct. 1, 2012, each of which is incorporated by reference in their entirety.

In particular embodiments, one or more of the content objects of the online network of users may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online network of users. Where the privacy settings for an object allow a particular user to access that object, the object may be described as being "visible" with respect to that user. For example, a user of the online network of users may specify privacy settings for a user-profile page identify a set of users that may access the work experience information on the user-profile page, thus excluding other users from accessing the information.

In particular embodiments, the privacy settings may specify a "blocked list" of users that should not be allowed to access certain information associated with the object. In other words, the blocked list may specify one or more users or entities for which an object is not visible. For example, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online network of users. For example, a particular concept node 1504 corresponding to a particular photo may have a privacy setting specifying that the photo may only be accessed by users tagged in the photo and their friends.

In particular embodiments, privacy settings may allow users to opt in or opt out of having their actions logged by the social networking system 1402 or shared with other systems (e.g., the third-party system 1408). In particular embodiments, the privacy settings associated with an object may specify any suitable granularity of permitted access or denial of access. For example, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of the third-party systems 1408, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, the social networking system 1402 may send a request to the data store for the object. The request may identify the user associated with the request and may only be sent to the user (or a client device 1406 of the user) if the authorization server determines that the user is authorized to access the object based on the privacy settings associated with the object. If the requesting user is not authorized to access the object, the authorization server may prevent the requested object from being retrieved from the data store or may prevent the requested object from being sent to the user.

In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific example embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
    providing, for display on a first participant device within a co-watching session, a first consolidated live video stream depicting a first arrangement of live video streams from participant devices within the co-watching session and a first digital media player interface to present a first stream of third-party co-watching digital video content;
    providing, for display on a second participant device within the co-watching session, a second consolidated live video stream depicting a second arrangement of live video streams from the participant devices within the co-watching session and a second digital media player interface to present a second stream of the third-party co-watching digital video content;
    receiving, from a participant device among the participant devices within the co-watching session, a selection from a third-party database of a third-party co-watching digital video content item for the co-watching session; and
    based on the selection, synchronizing playback of the third-party co-watching digital video content item within the first digital media player interface at the first participant device and the second digital media player interface at the second participant device without identifying the third-party co-watching digital video content item.

2. The method of claim 1, wherein synchronizing playback of the third-party co-watching digital video content item without identifying the third-party co-watching digital video content item comprises preventing transfer of information regarding the third-party co-watching digital video content item by:
    receiving, from the third-party database, an encrypted identifier indicating, and encrypting an identity of, the third-party co-watching digital video content item; and
    distributing the encrypted identifier to the first participant device and the second participant device.

3. The method of claim 1, wherein providing the second consolidated live video stream comprising providing a second number of live video streams different from a first number of live video streams within the first consolidated live video stream.

4. The method of claim 1, further comprising providing a selectable option to access the third-party database for display within a video chat interface of the participant device among the participant devices within the co-watching session.

5. The method of claim 4, further comprising:
    in response to receiving user interaction selecting the selectable option to access the third-party database, providing a login interface to access the third-party database for display within the video chat interface of the participant device; and
    in response to receiving user interaction entering credentials to access the third-party database via the login interface, providing a third-party co-watching digital video content selection menu for display within the video chat interface and depicting a plurality of third-party co-watching digital video content items stored within the third-party database.

6. The method of claim 5, wherein receiving the selection of the third-party co-watching digital video content item from the participant device comprises receiving user interaction selecting the third-party co-watching digital video content item from the third-party co-watching digital video content selection menu.

7. The method of claim 1, further comprising synchronizing playback of the third-party co-watching digital video content item within the first digital media player interface at the first participant device and the second digital media player interface at the second participant device without monitoring, tracking, or storing the third-party co-watching digital video content item.

8. A non-transitory computer readable medium comprising instructions that, when executed by at least one processor, cause a computing device to:
    provide, for display on a first participant device within a co-watching session, a first consolidated live video stream depicting a first arrangement of live video streams from participant devices within the co-watching session and a first digital media player interface to present a first stream of third-party co-watching digital video content;
    provide, for display on a second participant device within the co-watching session, a second consolidated live video stream depicting a second arrangement of live video streams from the participant devices within the co-watching session and a second digital media player interface to present a second stream of the third-party co-watching digital video content;
    receive, from a participant device among the participant devices within the co-watching session, a selection from a third-party database of a third-party co-watching digital video content item for the co-watching session; and
    based on the selection, synchronize playback of the third-party co-watching digital video content item within the first digital media player interface at the first participant device and the second digital media player interface at the second participant device without identifying the third-party co-watching digital video content item.

9. The non-transitory computer readable medium of claim 8, further comprising instructions that, when executed by the at least one processor, cause the computing device to synchronize playback of the third-party co-watching digital video content item without identifying the third-party co-watching digital video content item by preventing transfer of information regarding the third-party co-watching digital video content item by:
    receiving, from the third-party database, an encrypted identifier indicating, and encrypting an identity of, the third-party co-watching digital video content item; and
    distributing the encrypted identifier to the first participant device and the second participant device.

10. The non-transitory computer readable medium of claim 8, further comprising instructions that, when executed by the at least one processor, cause the computing device to provide the second consolidated live video stream by providing a second number of live video streams different from a first number of live video streams within the first consolidated live video stream.

11. The non-transitory computer readable medium of claim 8, further comprising instructions that, when executed by the at least one processor, cause the computing device to provide a selectable option to access the third-party database for display within a video chat interface of the participant device among the participant devices within the co-watching session.

12. The non-transitory computer readable medium of claim 11, further comprising instructions that, when executed by the at least one processor, cause the computing device to:
in response to receiving user interaction selecting the selectable option to access the third-party database, provide a login interface to access the third-party database for display within the video chat interface of the participant device; and
in response to receiving user interaction entering credentials to access the third-party database via the login interface, provide a third-party co-watching digital video content selection menu for display within the video chat interface and depicting a plurality of third-party co-watching digital video content items stored within the third-party database.

13. The non-transitory computer readable medium of claim 12, further comprising instructions that, when executed by the at least one processor, cause the computing device to receive the selection of the third-party co-watching digital video content item from the participant device by receiving user interaction selecting the third-party co-watching digital video content item from the third-party co-watching digital video content selection menu.

14. The non-transitory computer readable medium of claim 8, further comprising instructions that, when executed by the at least one processor, cause the computing device to synchronize playback of the third-party co-watching digital video content item within the first digital media player interface at the first participant device and the second digital media player interface at the second participant device without monitoring, tracking, or storing the third-party co-watching digital video content item.

15. A system comprising:
at least one processor; and
a non-transitory computer readable medium comprising instructions that, when executed by the at least one processor, cause the system to:
provide, for display on a first participant device within a co-watching session, a first consolidated live video stream depicting a first arrangement of live video streams from participant devices within the co-watching session and a first digital media player interface to present a first stream of third-party co-watching digital video content;
provide, for display on a second participant device within the co-watching session, a second consolidated live video stream depicting a second arrangement of live video streams from the participant devices within the co-watching session and a second digital media player interface to present a second stream of the third-party co-watching digital video content;
receive, from a participant device among the participant devices within the co-watching session, a selection from a third-party database of a third-party co-watching digital video content item for the co-watching session; and
based on the selection, synchronize playback of the third-party co-watching digital video content item within the first digital media player interface at the first participant device and the second digital media player interface at the second participant device without identifying the third-party co-watching digital video content item.

16. The system of claim 15, further comprising instructions that, when executed by the at least one processor, cause the system to synchronize playback of the third-party co-watching digital video content item without identifying the third-party co-watching digital video content item by preventing transfer of information regarding the third-party co-watching digital video content item by:
receiving, from the third-party database, an encrypted identifier indicating, and encrypting an identity of, the third-party co-watching digital video content item; and
distributing the encrypted identifier to the first participant device and the second participant device.

17. The system of claim 15, further comprising instructions that, when executed by the at least one processor, cause the system to provide the second consolidated live video stream by providing a second number of live video streams different from a first number of live video streams within the first consolidated live video stream.

18. The system of claim 15, further comprising instructions that, when executed by the at least one processor, cause the system to provide a selectable option to access the third-party database for display within a video chat interface of the participant device among the participant devices within the co-watching session.

19. The system of claim 18, further comprising instructions that, when executed by the at least one processor, cause the system to:
in response to receiving user interaction selecting the selectable option to access the third-party database, provide a login interface to access the third-party database for display within the video chat interface of the participant device; and
in response to receiving user interaction entering credentials to access the third-party database via the login interface, provide a third-party co-watching digital video content selection menu for display within the video chat interface and depicting a plurality of third-party co-watching digital video content items stored within the third-party database.

20. The system of claim 19, further comprising instructions that, when executed by the at least one processor, cause the system to receive the selection of the third-party co-watching digital video content item from the participant device by receiving user interaction selecting the third-party co-watching digital video content item from the third-party co-watching digital video content selection menu.

\* \* \* \* \*